(12) United States Patent
Alaimo et al.

(10) Patent No.: US 6,690,853 B1
(45) Date of Patent: Feb. 10, 2004

(54) TUNABLE DWDM DEMULTIPLEXER

(75) Inventors: S. Christopher Alaimo, Boulder, CO (US); Edward J Bortolini, Nederland, CO (US); Marc DeFrancesco, Sebastopol, CA (US); Keith Honea, Denver, CO (US); David Marinelli, Santa Clara, CA (US); Steven Mechels, Louisville, CO (US); Jim Rice, Lafayette, CO (US); Robert T. Weverka, Boulder, CO (US); Andrew J. M. Kiruluta, Boulder, CO (US); Christopher Stephen Wood, Boulder, CO (US); Robert W. Kaliski, Boulder, CO (US)

(73) Assignee: PTS Corporation, San Jose, CA (US)

( * ) Notice: Subject to any disclaimer, the term of this patent is extended or adjusted under 35 U.S.C. 154(b) by 105 days.

(21) Appl. No.: 10/095,794

(22) Filed: Mar. 11, 2002

(51) Int. Cl.[7] .................................................. G02B 6/28

(52) U.S. Cl. .............................. 385/24; 385/37; 385/10; 385/33

(58) Field of Search ............................. 385/24, 10, 37, 385/14, 33, 16–23; 359/589, 578

(56) References Cited

U.S. PATENT DOCUMENTS

| | | | |
|---|---|---|---|
| 5,414,540 A | 5/1995 | Patel et al. | |
| 5,917,625 A | 6/1999 | Ogusu et al. | |
| 5,960,133 A | 9/1999 | Tomlinson | |
| 5,999,672 A | 12/1999 | Hunter et al. | |
| 6,097,519 A | 8/2000 | Ford et al. | |
| 6,097,859 A | 8/2000 | Solgaard et al. | |
| 6,108,471 A | 8/2000 | Zhang et al. | |
| 6,307,657 B1 | 10/2001 | Ford | |
| 6,501,877 B1 * | 12/2002 | Weverka et al. | ............... 385/33 |

OTHER PUBLICATIONS

U.S. patent application Ser. No. 09/442,061, Weverka et al., filed Nov. 16, 1999.
Ford, Joseph E., et al., "Wavelength Add–Drop Switching Using Tilting Micromirrors," Journal of Lightwave Technology, vol. 17, No. 5, May 1999.
Grade, John D., et al., "A Large–Deflection Electrostatic Actuator for Optical Switching Applications," Solid–State Sensor and Actuator Workshop, Hilton Head, SC, Jun. 4–8, 2000.
Nishi, I., et al., "Broad–Passband–Width Optical Filter for Multi/Demultiplexer Using a Diffraction Grating and a Retroreflector Prism," Electronics Letters, vol. 21, No. 10, May 9, 1985.
Philippe, P., et al, "Wavelength demultiplexer: using echelette gratings on silicon substrate," Applied Optics, vol. 24, No. 7, Apr. 1, 1985.
Rallison, R.D., "Dense Wavelength Division Multiplexing (DWDM) and the Dickson Grating," White Paper, Jan. 6, 2001.
Sun, Z. J., et al., Demultiplexer with 120 Channels and 0.29–nm Channel Spacing, IEEE Photonics Technology Letters, vol. 10, No. 1, Jan. 1998.

* cited by examiner

*Primary Examiner*—Phan T. H. Palmer
(74) *Attorney, Agent, or Firm*—Townsend and Townsend and Crew LLP

(57) ABSTRACT

A tunable demultiplexer accepts an input optical signal that has multiple spectral bands and provides multiple output signals. Each of the output signals corresponds to a selected one of the spectral bands. The tunable demultiplexer has at least one wavelength routing element and at least one optical arrangement disposed to exchange light with the wavelength routing element. The wavelength routing element is of the type adapted for selectively routing wavelength components of a first optical signal onto multiple second optical signals according to a configurable state.

53 Claims, 20 Drawing Sheets

TUNABLE DWDM DEMULTIPLEXER

BACKGROUND OF THE INVENTION

This application relates generally to fiber-optic communications. This application relates more specifically to methods and systems for tunable demultiplexing of optical signals.

The Internet and data communications are causing an explosion in the global demand for bandwidth. Fiber optic telecommunications systems are currently deploying a relatively new technology called dense wavelength division multiplexing (DWDM) to expand the capacity of new and existing optical fiber systems to help satisfy this demand. In DWDM, multiple wavelengths of light simultaneously transport information through a single optical fiber. Each wavelength operates as an individual channel carrying a stream of data. The carrying capacity of a fiber is multiplied by the number of DWDM channels used. Today DWDM systems employing up to 80 channels are available from multiple manufacturers, with more promised in the future.

In all telecommunication networks, there is the need to connect individual channels (or circuits) to individual destination points, such as an end customer or to another network. Systems that perform these functions are called cross-connects. Additionally, there is the need to add or drop particular channels at an intermediate point. Systems that perform these functions are called add-drop multiplexers (ADMs). All of these networking functions are currently performed by electronics—typically an electronic SONET/SDH system. However, SONET/SDH systems are designed to process only a single optical channel. Multi-wavelength systems would require multiple SONET/SDH systems operating in parallel to process the many optical channels. This makes it difficult and expensive to scale DWDM networks using SONET/SDH technology.

The alternative is an all-optical network. Optical networks designed to operate at the wavelength level are commonly called "wavelength routing networks" or "optical transport networks" (OTN). In a wavelength routing network, the individual wavelengths in a DWDM fiber must be manageable. The ultimate connection of individual channels to their destination points requires that the multiplexed optical signal be demultiplexed. Such demultiplexing may also be needed for other specific applications. Currently, passive optical elements are used to impose a fixed relationship between the component wavelengths of the DWDM signal and the physical output ports. To change the relationship of wavelengths to output ports with such a passive system requires replacing the passive optical arrangement. There are various circumstances under which it is desirable to change this relationship, and accordingly there is a general need in the art for a DWDM demultiplexer that may tune this relationship dynamically for individual applications.

BRIEF SUMMARY OF THE INVENTION

Embodiments of the invention thus provide a tunable demultiplexer. The tunable demultiplexer accepts an input optical signal that has a plurality of spectral bands and provides a plurality of output signals. Each of the output signals corresponds to a selected one of the spectral bands. The tunable demultiplexer has at least one wavelength routing element ("WRE") and at least one optical arrangement disposed to exchange light with the WRE. The WRE is of the type adapted for selectively routing wavelength components of a first optical signal onto a plurality of second optical signals according to a configurable state of the WRE. The correspondence of a subset of the spectral bands to the plurality of output signals may be determined by a state of the optical arrangement(s) and/or a state of the WRE(s). The WRE may generally be of any type, including a four-pass or two-pass WRE.

The optical arrangement(s) may have a variety of forms in different embodiments and may include such elements as passive filter elements, tunable filter elements, fixed wavelength band filters, tunable wavelength band filters, optical power splitters, optical interleavers, and optical combiners, among others. In certain embodiments, the optical arrangement(s) may also include one or more WREs. In one such embodiment, the WREs are arranged as a tree.

In one embodiment, the optical arrangement includes a plurality of serial arrangements of tunable wavelength band filters, each adapted to provide a first output that transmits a selected filtered portion of a received optical signal and a second output that transmits a remaining portion of the received optical signal. At least one of the tunable wavelength band filters in each of the serial arrangements is configured to received an equivalent to one of the second optical signals provided by the WRE, such as may be provided through the use of an optical splitter.

In another embodiment, the optical arrangement includes an optical power splitter and a plurality of tunable filters disposed to receive light from the optical power splitter. The optical power splitter may be disposed to receive one of the second optical signals from the WRE. The tunable filters may comprise one or more tunable narrowband filters or may comprise one or more tunable wideband filters. In a specific embodiment, the plurality of tunable filters comprises at least one pair of tunable wideband filters tuned with a narrow frequency overlap.

In further embodiments, the optical arrangement includes at least one optical space switch. In one such embodiment, a plurality of WREs are used, each WRE being disposed to receive an equivalent to the input optical signal and configured to route distinct subsets of desired spectral bands to respective filter elements. The filter elements are then configured to transmit individual spectral bands to the optical space switch(es). In one embodiment that uses a plurality of optical space switches, each optical space switch is associated with one of the WREs and the optical arrangement includes a plurality of optical combiners. Each optical combiner receives optical signals from each of the optical space switches and transmits an optical signal corresponding to one of the output signals.

In another embodiment that uses an optical space switch, the optical arrangement has at least one optical interleaver disposed to receive one of the second optical signals from the WRE. A plurality of filter elements are disposed to receive optical signals from the optical interleaver and to transmit optical signals to the optical space switch. A plurality of optical interleavers may be arranged as a tree in one embodiment.

Instead of using an optical space switch, in some embodiments the output signals are electrical signals and an electrical space switch is used. In one such embodiment, a plurality of WREs are used with each WRE being disposed to receive an equivalent to the input optical signal and to route distinct subsets of the desired spectral bands to respective filter elements. The filter elements are configured to transmit individual spectral bands to receivers for conversion to electrical signals. The electrical signals are then provided to the electrical space switch.

In still another embodiment, the optical arrangement includes a plurality of filter arrangements. Each filter arrangement has a plurality of tunable filters arranged serially and disposed to receive an equivalent to one of the second optical signals from the WRE.

In still a further embodiment, the optical arrangement includes a passive wideband filter.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral and is enclosed in parentheses to denote one of multiple similar components. When reference is made to a reference numeral without specification to an existing sublabel, it is intended to refer to all such multiple similar components.

DETAILED DESCRIPTION OF THE INVENTION

1. Introduction

Figure 1:
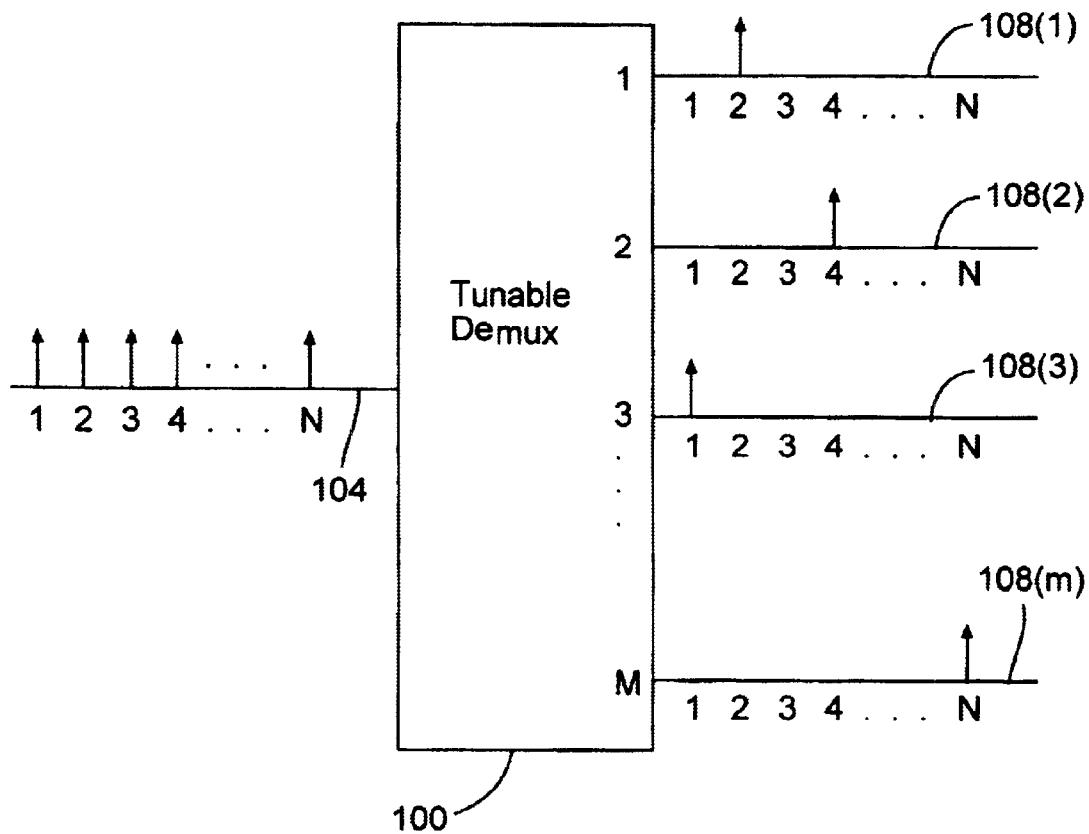
FIG. 1 is a schematic diagram illustrating the operation of a tunable demultiplexer.

The following description sets forth embodiments of a tunable demultiplexer according to the invention. The general operation of such a tunable demultiplexer is shown schematically in FIG. 1. An input multiplexed signal 104 is provided to the tunable demultiplexer 100 at a demux input port and demultiplexed signals 108 are provided at demux output ports. The input signal 104 is multiplexed in the specific sense that it includes a plurality of spectral bands. Although the incoming signal 104 could have a continuous spectrum, adjacent segments of which could be considered different spectral bands, it is generally contemplated that the spectrum of the incoming light will have a plurality of spaced bands, denoted as corresponding to channels 1, 2, 3, . . . N in FIG. 1.

The spectral bands are directed by the tunable demultiplexer 100 according to their wavelengths to specific demux output ports, depending on a state of the tunable demultiplexer 100. The state of the tunable demultiplexer is determined by the state of an electronic control. In some embodiments, the number of demux output ports M may be equal to the number N of spectral bands, but this is not a requirement. Moreover, in some embodiments, only a subset of the spectral bands will be directed to demux output ports, with undesired spectral bands being effectively discarded through operation of the tunable demultiplexer 100. Where that subset has a number of spectral bands equal to the number of demux output ports M, light will be directed to every demux output port, but more generally the operation of the tunable demultiplexer 100 will direct light to a subset (inclusive of both the full set and of the null set) of the available demux output ports.

The terms "input port" and "output port" are intended to have broad meanings. At the broadest, a port is defined by a point where light enters or leaves the system. For example, the input (or output) port could be the location of a light source (or detector) or the location of the downstream end of an input fiber (or the upstream end of an output fiber). In specific embodiments, the structure at the port location could include a fiber connector to receive the fiber, or could include the end of a fiber pigtail, the other end of which is connected to outside components.

The International Telecommunications Union (ITU) has defined a standard wavelength grid having a frequency band centered at 194,100 GHz, and another band at every 50 GHz interval around 194,100 GHz. This corresponds to a wavelength spacing of approximately 0.4 nm around a center wavelength of approximately 1550 nm, it being understood that the grid is uniform in frequency and only approximately uniform in wavelength. Embodiments of the invention are preferably designed for the ITU grid, but frequency intervals of 25 GHz and 100 GHz (corresponding to wavelength spacings of approximately 0.2 nm and 0.8 nm) are also of interest.

2. Wavelength Routing Element

Certain embodiments for a tunable demultiplexer according to the invention include one or more wavelength routing elements ("WRE"). Such a WRE is an optical device that receives multiplexed light at a WRE input port and redirects subsets of the spectral bands comprised by the multiplexed light to respective ones of a plurality of WRE output ports. Embodiments for the tunable demultiplexer that use a WRE may generally use any configuration for routing subsets of a plurality of spectral bands received at a WRE input port to respective ones of a plurality of WRE output ports. In some instances, a particular WRE may be provided in a one-pass, two-pass, four-pass, or other configuration. Some examples of suitable WREs are described in detail below, and additional examples of WREs that may be comprised by certain embodiments are described in the copending, commonly assigned United States Patent Application, filed Nov. 16, 1999 and assigned Serial No. 09/442,061, entitled "Wavelength Router," by Robert T. Weverka et al., now U.S. Pat. No. 6,501,877 B1 which is herein incorporated by reference in its entirety, including the Appendix, for all purposes.

In some embodiments, wavelength routing functions within the WRE may be performed optically with a free-space optical train disposed between the WRE input port and the WRE output ports, and a routing mechanism. The free-space optical train can include air-spaced elements or can be of generally monolithic construction. The optical train includes a dispersive element such as a diffraction grating, and is configured so that the light from the WRE input port encounters the dispersive element twice before reaching any of the WRE output ports. The routing mechanism includes one or more routing elements and cooperates with the other elements in the optical train to provide optical paths that couple desired subsets of the spectral bands to desired WRE output ports. The routing elements are disposed to intercept the different spectral bands after they have been spatially separated by their first encounter with the dispersive element. A WRE configured to perform wavelength-dependent routing from a single WRE input port to L WRE output ports is sometimes referred to herein as a "1×L WRE." Further, any 1×L WRE embodiment may alternatively be used as an L×1 WRE by providing L input signals to the L WRE output ports, effectively treating them as WRE input ports, and by receiving the output signal from the WRE input port, effectively treating it as a WRE output port.

Figure 2A:
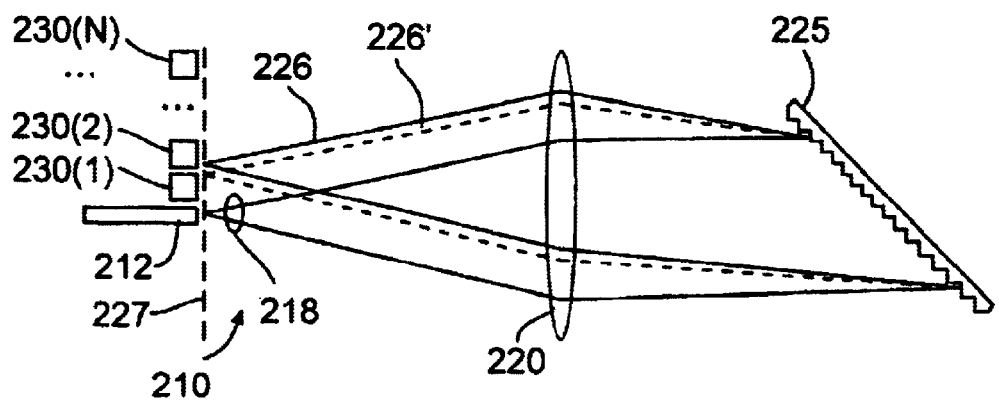
FIGS. 2A, 2B, and 2C are schematic top, side, and end views, respectively, of an optical wavelength routing element used in certain embodiments of the invention.
Figure 2B:
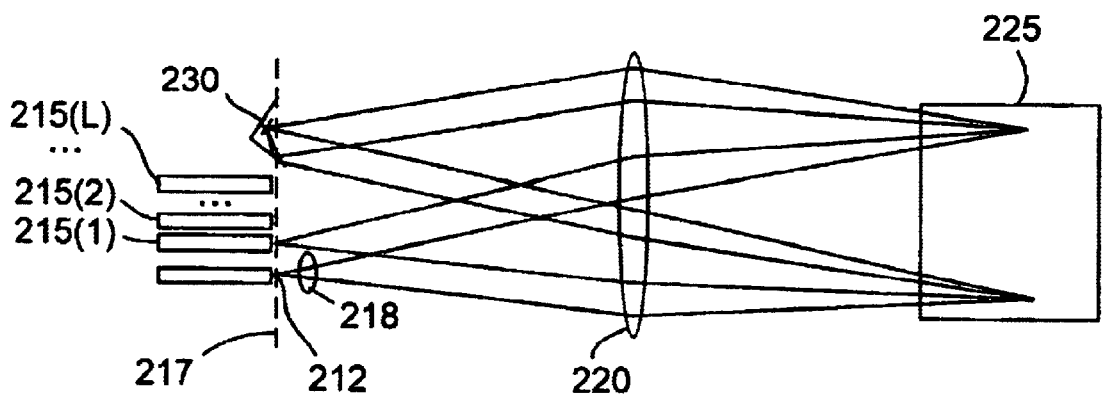
Figure 2C:
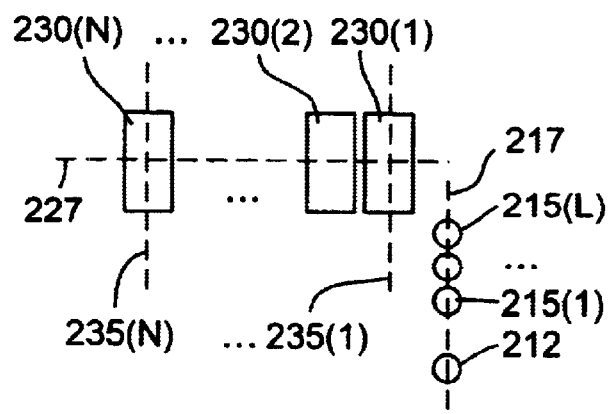

FIGS. 2A, 2B, and 2C are schematic top, side, and end views, respectively, of one embodiment of a WRE 210. This embodiment may be considered to be a four-pass WRE. Its general functionality is to accept light having a plurality N of spectral bands at a WRE input port 212, and to direct subsets of the spectral bands to desired ones of a plurality L of WRE output ports, designated 215(1) . . . 215(L). The output ports are shown in the end view of FIG. 2C as disposed along a line 217 that extends generally perpendicular to the top view of FIG. 2A. Light entering the WRE 10 from WRE input port 212 forms a diverging beam 218, which includes the different spectral bands. Beam 218 encounters a lens 220 that collimates the light and directs it to a reflective diffraction grating 225. The grating 225 disperses the light so that collimated beams at different wavelengths are directed at different angles back towards the lens 220.

Two such beams are shown explicitly and denoted 226 and 226', the latter drawn in dashed lines. Since these collimated beams encounter the lens 220 at different angles, they are focused towards different points along a line 227 in a transverse plane extending in the plane of the top view of FIG. 2A. The focused beams encounter respective ones of a plurality of retroreflectors, designated 230(1) . . . 230(N), located near the transverse plane. Various examples of micromirror configurations that may be used as part of the retroreflectors, among others, are described in the following copending, commonly assigned applications, each of which is herein incorporated by reference in its entirety for all purposes: U.S. patent application Ser. No. 09/898,988, entitled "SYSTEMS AND METHODS FOR OVERCOMING STICTION USING A LEVER," filed Jul. 3, 2001 by Bevan Staple et al.; U.S. patent application Ser. No. 09/899,000 now U.S. Pat. No. 6,535,319, entitled "FREE-SPACE OPTICAL WAVELENGTH ROUTER BASED ON STEPWISE CONTROLLED TILTING MIRRORS," filed Jul. 3, 2001 by Victor Buzzetta et al.; U.S. patent application Ser. No. 09/899,001, entitled "TWO-DIMENSIONAL FREE-SPACE OPTICAL WAVELENGTH ROUTER BASED ON STEPWISE CONTROLLED TILTING MIRRORS," filed Jul. 3, 2001 by Victor Buzzetta; U.S. patent application Ser. No. 09/899,002, entitled "MEMS-BASED, NONCONTACTING, FREE-SPACE OPTICAL SWITCH," filed Jul. 3, 2001 by Bevan Staple and Richard Roth; U.S. patent application Ser. No. 09/899,004, entitled "BISTABLE MICROMIRROR WITH CONTACTLESS STOPS," filed Jul. 3, 2001 by Lilac Muller; U.S. patent application Ser. No. 09/899,014, entitled "METHODS AND APPARATUS FOR PROVIDING A MULTI-STOP MICROMIRROR," filed Jul. 3, 2001 by David Paul Anderson; and U.S. patent application Ser. No. 09/941,998 U.S. Pat. No. 6,439,728, entitled "MULTIMIRROR STACK FOR VERTICAL INTEGRATION OF MEMS DEVICES IN TWO-POSITION RETROREFLECTORS," filed Aug. 28, 2001 by Frederick Kent Copeland.

The beams are directed back, as diverging beams, to the lens 220 where they are collimated, and directed again to the grating 225. On the second encounter with the grating 225, the angular separation between the different beams is removed and they are directed back to the lens 220, which focuses them. The retroreflectors 230 may be configured to send their intercepted beams along a reverse path displaced along respective lines 235(1) . . . 235(N) that extend generally parallel to line 217 in the plane of the side view of FIG. 2B and the end view of FIG. 2C, thereby directing each beam to one or another of WRE output ports 215.

Figure 3A:
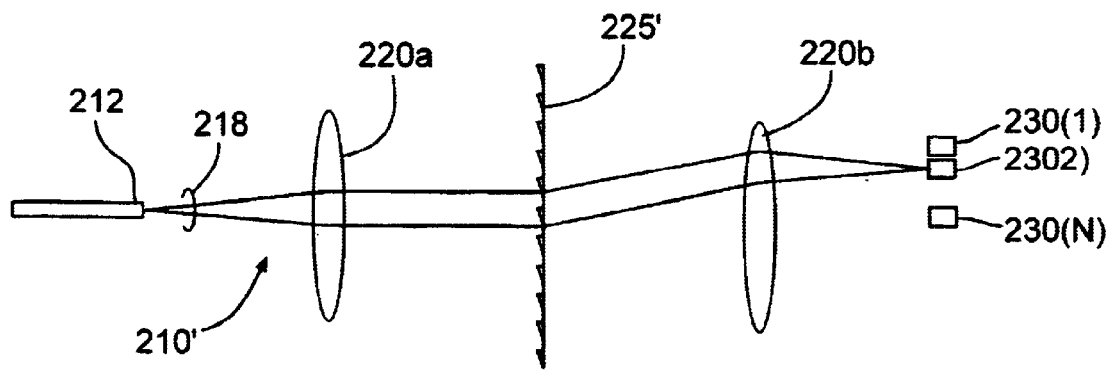
FIGS. 3A and 3B are schematic top and side views, respectively, of an optical wavelength routing element used in certain embodiments of the invention.
Figure 3B:
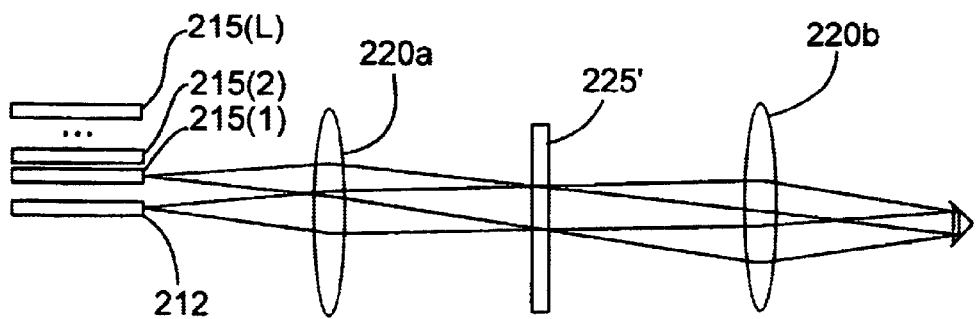

Another embodiment of a WRE, designated 210', is illustrated with schematic top and side views in FIGS. 3A and 3B, respectively. This embodiment may be considered an unfolded version of the embodiment of FIGS. 2A–2C and operates as a two-pass WRE. Light entering the WRE 10' from WRE input port 212 forms diverging beam 218, which includes the different spectral bands. Beam 218 encounters a first lens 220a, which collimates the light and directs it to a transmissive grating 225'. The grating 225' disperses the light so that collimated beams at different wavelengths encounter a second lens 220b, which focuses the beams. The focused beams are reflected by respective ones of plurality of retroreflectors 230, which may also be configured as described above, as diverging beams, back to lens 220b, which collimates them and directs them to grating 225'. On the second encounter, the grating 225' removes the angular separation between the different beams, which are then focused in the plane of WRE output ports 215 by lens 220a.

Figure 4:
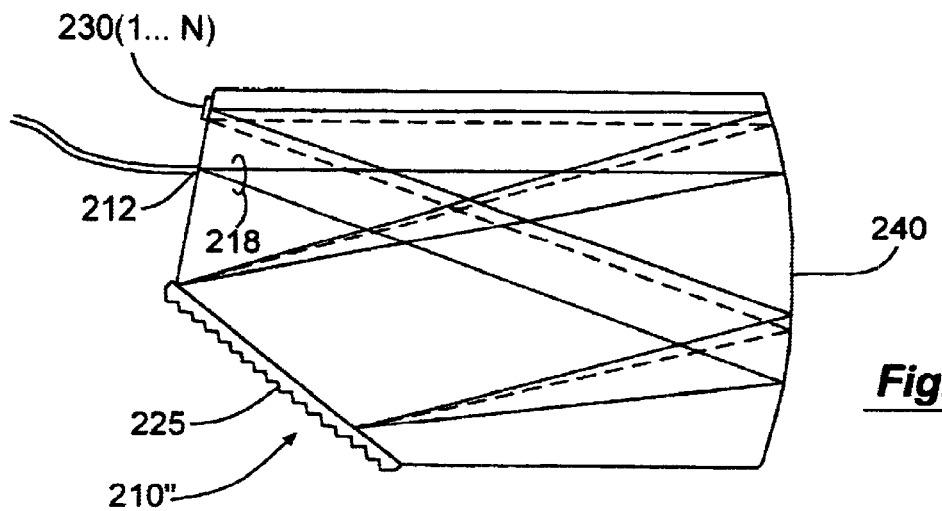
FIG. 4 is a schematic top view of an optical routing element according to a third embodiment of the invention.

A third embodiment of a WRE, designated 210", is illustrated with the schematic top view shown in FIG. 4. This embodiment is a further folded version of the embodiment of FIGS. 2A–2C, shown as a solid glass embodiment that uses a concave reflector 240 in place of lens 220 of FIGS. 2A–2C or lenses 220a and 220b of FIGS. 3A–3B. Light entering the WRE 210" from input port 212 forms diverging beam 218, which includes the different spectral bands. Beam 218 encounters concave reflector 240, which collimates the light and directs it to reflective diffraction grating 225, where it is dispersed so that collimated beams at different wavelengths are directed at different angles back towards concave reflector 240. Two such beams are shown explicitly, one in solid lines and one in dashed lines. The beams then encounter retroreflectors 230 and proceed on a return path, encountering concave reflector 240, reflective grating 225', and concave reflector 240, the final encounter with which focuses the beams to the desired WRE output ports. Again, the retroreflectors 230 may be configured as described above.

3. Optical and Electrical Components

In addition to the use of one or more WREs, different embodiments of the tunable demultiplexer use various optical and/or electrical components, a schematic illustration of some of which is provided in FIGS. 5A–5I.

Figure 5A:
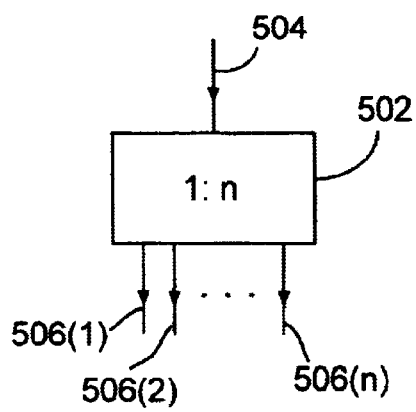
FIGS. 5A–5I are schematic illustrations showing the operation of various optical elements used in embodiments of the invention.

Thus, FIG. 5A provides a schematic illustration of a 1:n optical power splitter 502. An incident optical signal 504, which may be a multiplexed optical signal, is split by the optical power splitter 502 into a plurality n of output optical signals 506. The qualitative character of the incident optical signal 504 is preserved so that each of the output optical signals 506 is spectrally "equivalent" to the incident optical signal 504. The output optical signals 506 are referred to as "equivalent" since they may differ from the incident optical signal 506 in intensity as a result of power distribution by the optical power splitter 502 among the multiple output signals 506. A variety of commercially available optical power splitters 502 may be used in embodiments of the invention, a suitable example of which is the ACWA Series 1×N Wideband Single-Mode Splitters/Combiners provided by JDS Uniphase Corporation.

Figure 5B:
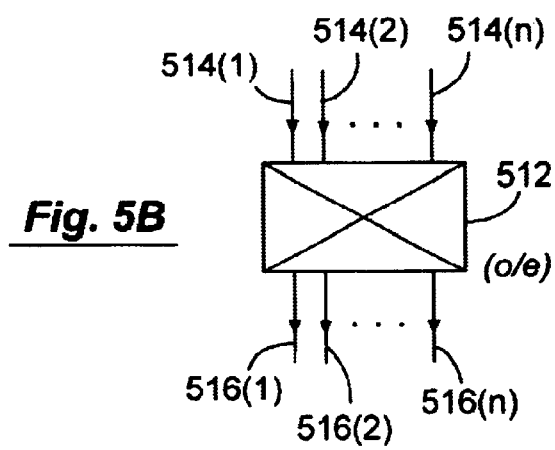

FIG. 5B provides a schematic illustration of a space switch 512. The parenthetical subscript o or e is used to denote whether the space switch 512 comprises an optical space switch or an electrical space switch respectively. The space switch 512 is a configurable element that may redistribute a plurality n of incident signals 514 onto n output signals 516. The redistribution is performed on a 1:1 basis so that each input signal 514 is directed to exactly one of the output signals 516, but the precise mapping may be determined arbitrarily according to a configuration of the space switch 512. In embodiments where the space switch 512 comprises an optical space switch, the input signals 514 and output signals 516 both comprise optical signals. One example of a commercially available optical space switch that may be used in embodiments of the invention is the N3565A 32×32 photonic switch provided by Agilent Technologies, although other commercially available devices may alternatively be used. Similarly, in embodiments where the space switch 512 comprises an electrical space switch, the input signals 514 and output signals 516 both comprise optical signals. The 52080 34×34 3.2 Gbit/s Differential Crosspoint Switch provided by Applied Micro Circuits Corporation is one example among various alternatives of a commercially available electrical space switch that may be used in embodiments of the invention.

Figure 5C:
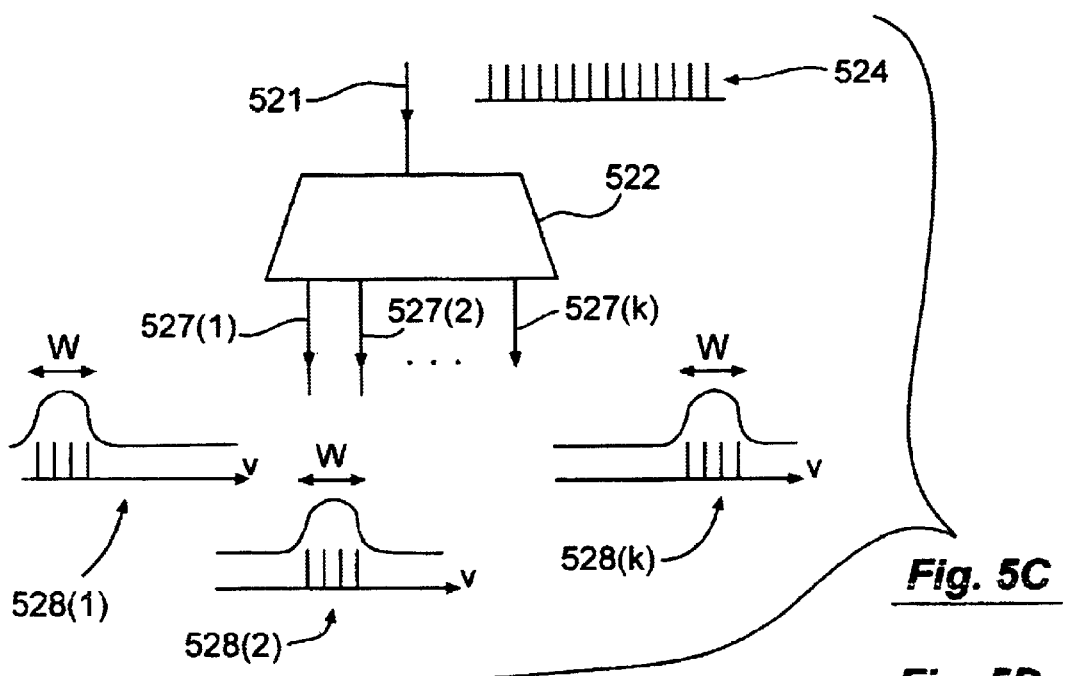

FIG. 5C provides a schematic illustration of a passive wideband filter 522. This optical element acts to separate light on an input signal 521 into a plurality k of output signals 527. Each output signals carries distinct optical content of the input signal according to a band having a width w. In one configuration, the bands for the optical signals are positioned in frequency v space substantially without overlap and collectively to cover a continuous spectrum. As used herein, such filter bands are considered to be "wide" if two or more spectral bands of an incident optical signal may be passed through the filter band. For example, with the standard ITU grid having a 50-GHz spacing, w≧50 GHz is considered to define a wide band.

FIG. 5C illustrates the operation of the passive wideband filter 522 by showing the effect of passing an optical signal having a profile 524 with a plurality of discrete, approximately equally spaced spectral bands. Each of the output signals 527 has a different resulting profile 528 depending on the frequency position of the filter band associated with that output. For example, the filter band for the first output has a width w and is positioned at the lowest frequency of the filter bands. Accordingly, the profile 528(1) associated with the first output signal 527(1) includes those spectral bands from the input signal 524 that fall within the low-frequency width-w band. The filter band for the second output has a width w and is positioned just above the first filter band. Accordingly, the profile 528(2) associated with the second output signal 527(2) includes those spectral bands from the input signal 524 that fall within the next width-w band. Similarly, each of the profiles 528 includes progressively higher-frequency spectral bands until the last profile 528(k), which includes the highest-frequency spectral bands. Various passive wideband filters with these general characteristics are commercially available, including, for example, the BWDM series filters provided by Oplink Communications.

Figure 5D:
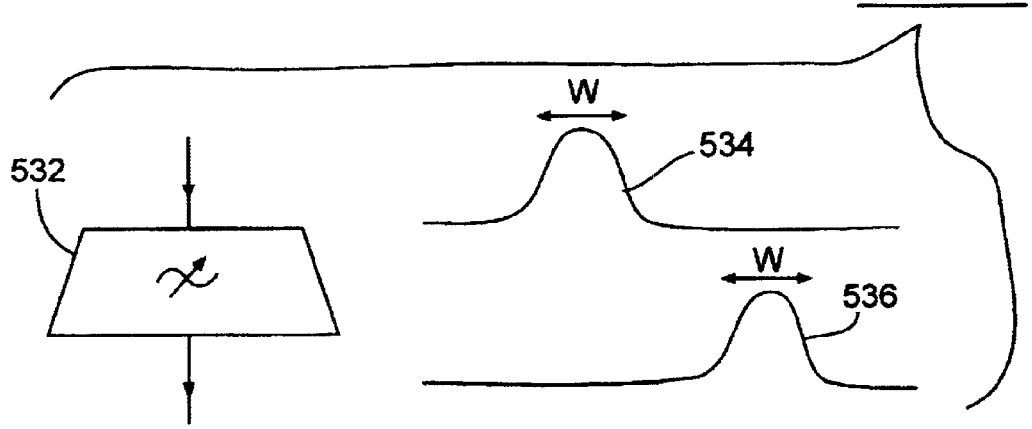

FIG. 5D provides a schematic illustration of a tunable wideband filter 532. This optical element acts similarly to the passive wideband filter illustrated in FIG. 5C, except that it has only a single output signal produced according to a filter profile that may be dynamically translated in frequency v (or equivalently in wavelength λ). Thus, for example, in different configurations, the element may have filter profile 534 or filter profile 536, which are offset with respect to each other in frequency. An example of a commercially available tunable wideband filter appropriate for embodiments of the invention is the OTF-655 motorized optical tunable filter provided by Santec Corporation, among others.

Figure 5E:
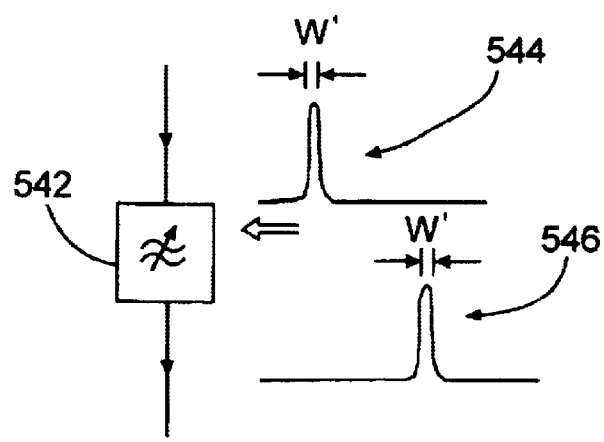

FIG. 5E provides a schematic illustration of a tunable narrowband filter 542. This optical element acts similarly to the tunable wideband filter illustrated in FIG. 5D but has a narrow filter profile. As shown by profiles 544 and 546, the tunable narrowband filter 542 has a narrow filter band that may be translated in frequency (or equivalently in wavelength) as desired. The width w' of the filter band is considered to be "narrow" if only a single spectral band comprised by the input optical signal is permitted to pass. Thus, for the standard ITU grid having a 50-GHz spacing, w'≦50 GHz is considered to define a narrow band, with different corresponding widths being considered narrow for different spectral-band spacings in the incident signal. Various tunable narrowband filters suitable for embodiments of the invention are commercially available, one example of which is the Agilewave™ Tunable Bandpass Filter provided by CiDRA Corporation.

Figure 5F:
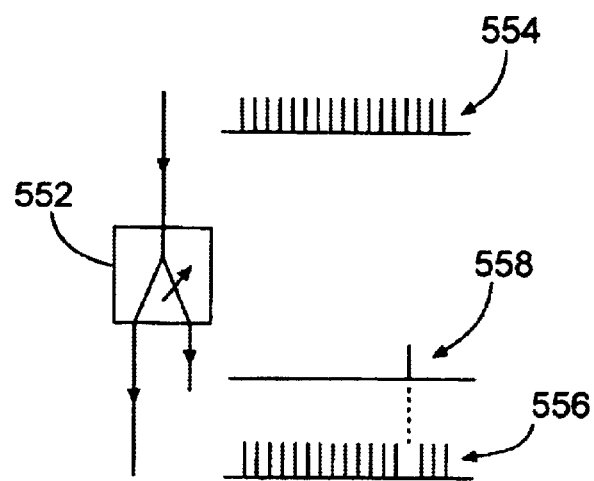

FIG. 5F provides a schematic illustration of a wavelength band filter 552, which may generally be fixed or partially tunable. This optical element operates by splitting an incident optical signal, shown with the spectral band distribution denoted 554, into two signals, shown respectively with the spectral band distributions denoted 556 and 558. The first output 558 of the optical element transmits some of the spectral bands from the input optical signal. A second output 556 of the optical element transmits the remaining spectral bands not filtered by the first output 558. The filter band profile corresponding to the first output 558 may define a narrow or wide band and may be fixed or tunable in different embodiments. In embodiments where the wavelength band filter is tunable, an arrow is denoted notationally as shown in the figure. Suitable commercially available wavelength band filters are available from Optoplex™ Corporation, such as its Nova Tunable OADM 1×2, among other providers.

Figure 5G:
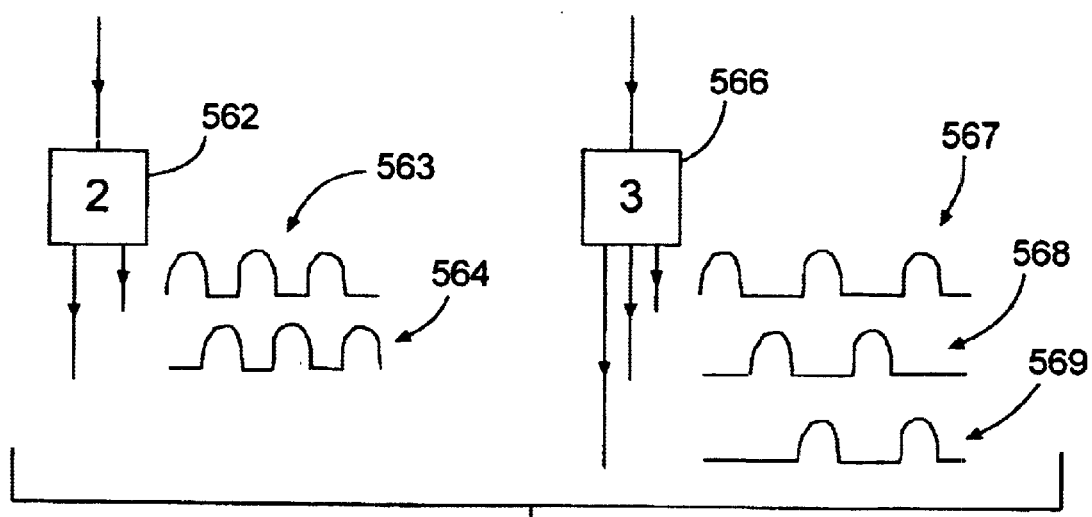

FIG. 5G provides schematic illustrations of optical interleavers, including a two-state optical interleaver 562 and a three-state optical interleaver 566. The generalization to an n-state optical interleaver is evident from the following description. The two-state optical interleaver 562 has a filter profile that selects alternate spectral bands from the incident optical signal. A first output is governed by filter profile 563 and a second output is governed by filter profile 564. In one embodiment, these filter profiles have band widths that correspond to the spectral band spacing in the incident optical signal and are out of phase with each other. Thus, the first output selects odd channels 1, 3, 5, . . . from the incident optical signal and the second output selects even channels 2, 4, 6, . . . from the incident optical signal. More generally, the band widths may be an even integral number of spectral band spacings. Thus, for example, where the spectral band spacing is 50 GHz and the band widths are 100 GHz, the first output selects channels 1, 2, 5, 6, 9, 10, . . . and the second output elects channels 3, 4, 7, 8, 9, 10, . . . . Still other integral numbers of spectral band spacings ay be used.

The three-state optical interleaver 566 operates similarly, but each of three outputs uses a filter profile to select every third channel. Thus, where the band width of the profiles is equal to the spectral band spacing, the first output selects channels 1, 4, 7, 10, . . . ; the second output selects channels 2, 5, 8, 11, . . . ; and the third output selects channels 3, 6, 9, 12, . . . . The band widths may also be equal to integral numbers of spectral band spacings so that, for example where the spectral band spacing is 50 GHz and the band widths are 100 GHz, the first output selects channels 1, 2, 7, 8, 13, 14, . . . ; the second output selects channels 3, 4, 9, 10, 15, 16, . . . ; and the third output selects channels 5, 6, 11, 12, 17, 18, . . . . More generally, an n-state optical interleaver includes n outputs and selects groups having an integral number of spectral bands by having filter profiles with band widths equal to that integral number times the spectral band spacing. An example of a commercially available optical interleaver that may be used with embodiments of the invention is the IBC 50/100 GHz Passive Interleaver supplied by JDS Uniphase Corporation, among other suppliers.

Figures 5H, 5I:
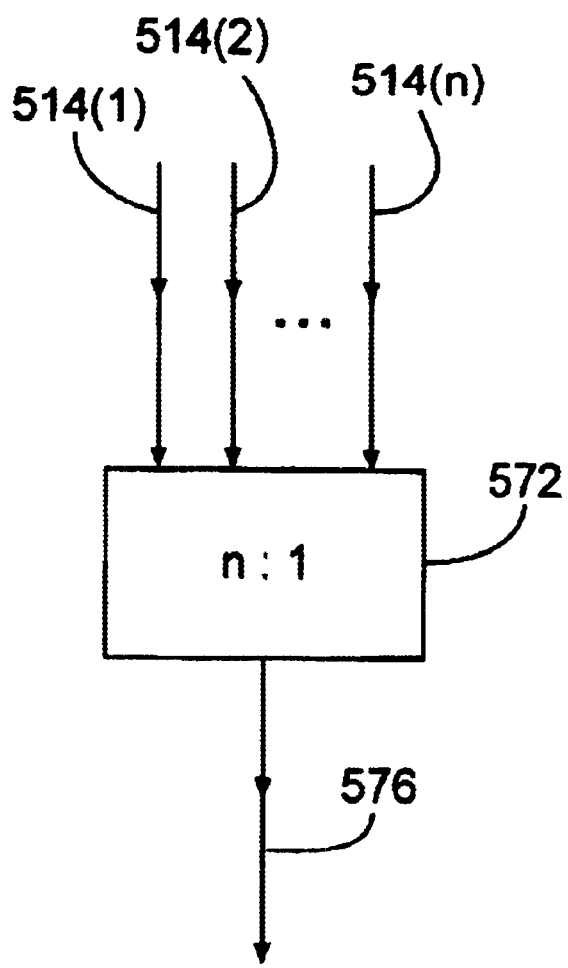

FIG. 5H provides a schematic illustration of an n:1 optical combiner 572. Conceptually, this optical element performs the reverse operation of the 1:n optical power splitter shown in FIG. 5A by receiving a plurality n of optical signals 574 and combining them into a single output optical signal 576. A commercially available optical combiner is the ACWA Series 1×N Wideband Single-Mode Splitters/Combiners provided by JDS Uniphase Corporation, and may be used in embodiments of the invention.

FIG. 5I provides a schematic illustration of a receiver 582 configured to receive an optical signal 584 and to generate a corresponding electrical signal 586. A suitable receiver that may be obtained commercially is the R485-Type Lightcrave Receiver with Clock Recovery for 2.488 Gbits/s Applications provided by Agere Systems.

4. Tunable Demultiplexer

FIGS. 6A through 11B illustrate several embodiments for a tunable demultiplexer in accordance with the invention. In several such embodiments, a WRE is used in combination with an optical arrangement that comprises one or more optical elements shown schematically in FIGS. 5A–5I. The various illustrated embodiments for the tunable demultiplexer are intended to illustrate general principles by which the demultiplexer may be configured. It will be understood by those of skill in the art how such general principles may be adapted to produce other embodiments that are also within the spirit and scope of the invention.

a. Optical Arrangements Having Wavelength Band Filters

Figure 6A:
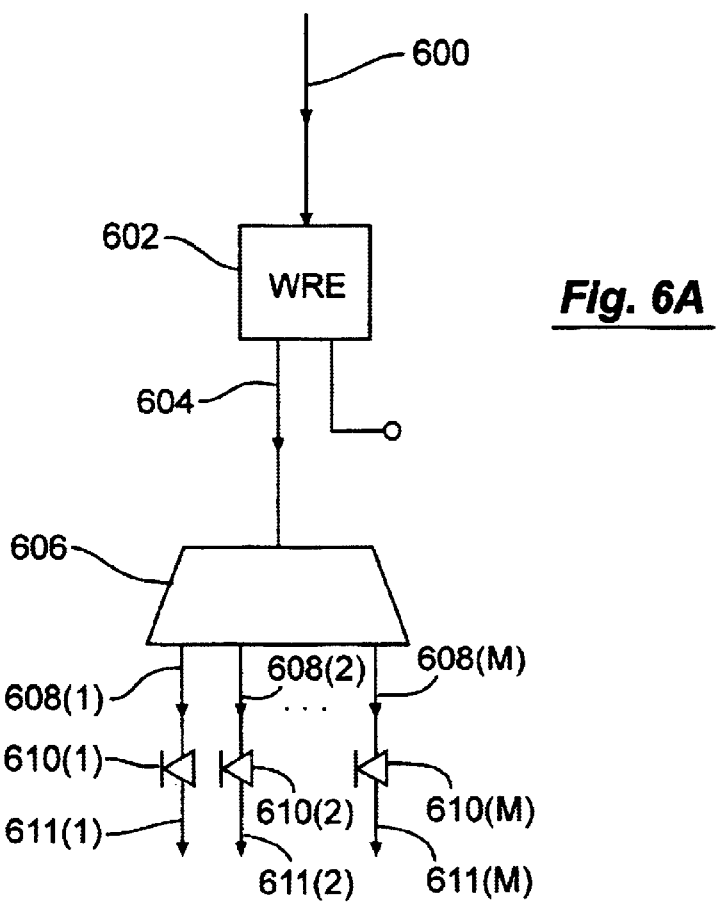
FIGS. 6A–6C provide schematic illustrations of embodiments for a tunable demultiplexer according to the invention having optical arrangements using wavelength band filters.
Figure 6B:
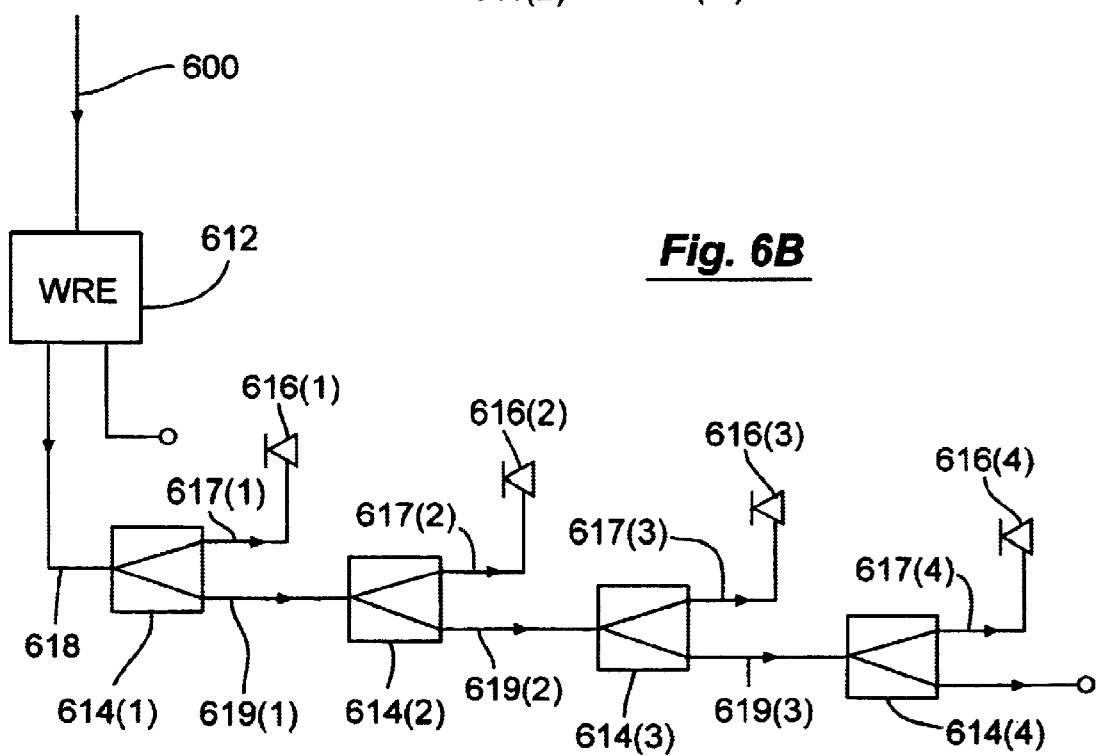
Figure 6C:
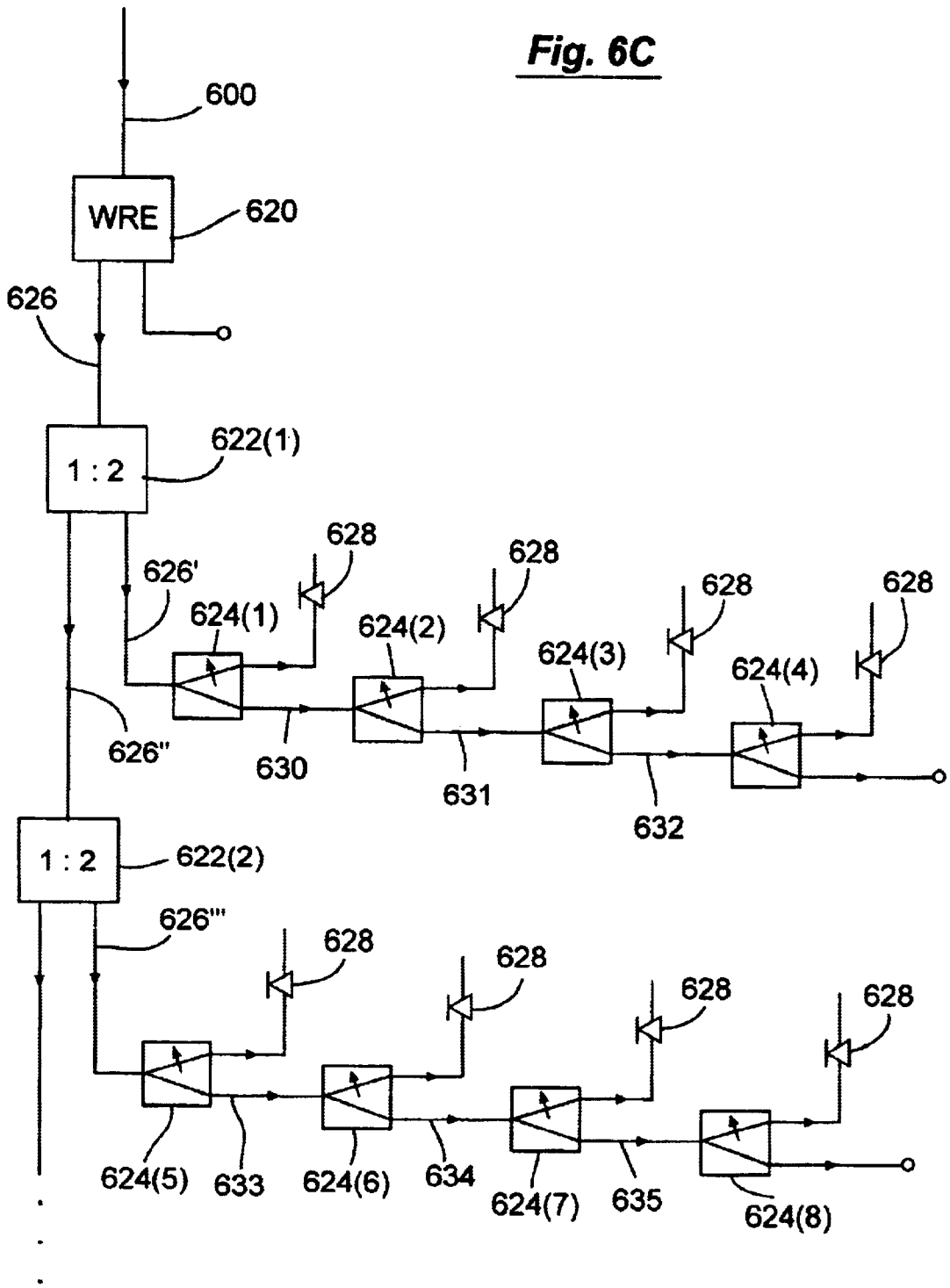

FIGS. 6A–6C provide examples of optical arrangements that may be coupled with a WRE to provide tunable demultiplexing functions. In some instances, a fixed-wavelength band filter is used in which a signal is transmitted along one output and is filtered at a fixed wavelength along another output. In other instances, tunable wavelength band filters are used in which the filtered wavelength may be determined by a configuration of the wavelength band filter.

FIG. 6A provides an illustration of a partially tunable demultiplexer. An input optical signal 600 includes a plurality of spectral bands and is directed to a WRE 602. As shown, the WRE 602 is arranged as a 1×2 WRE, although different arrangements may also be used. The WRE 602 acts to preselect the desired M spectral bands from the input optical signal 600 and to preserve them in optical signal 604; the other spectral bands are discarded or directed to other optical arrangements through the other WRE output port, or discarded through the action of the WRE. Optical signal 604 is directed to a wideband filter 606 having a plurality (at least M) of filter bands. Accordingly, the spectral bands selected by the WRE 602 and comprised by optical signal 604 will generally be separated in wavelength by an amount greater than the width of the filter bands in the wideband filter. In one embodiment, the bands are closely spaced. The wideband filter 606 thus separates the spectral bands so that individual optical signals 608 are each provided with a single one of the spectral bands. Such optical signals 608 may then be directed to receivers 610 to convert the optical signals to electrical signals.

The arrangement shown in FIG. 6A provides a tunable demultiplexer because there are several configurations of spectral-band selections by the WRE 602 that result in a single one of the spectral bands being present on the individual optical signals 608. It may be considered to be a partially tunable demultiplexer because no explicit provision is made for arbitrarily reconfiguring the location of the selected spectral bands among optical signals 608 or electrical signal 611. The use of the WRE 602 nevertheless permits individual spectral bands to be selected dynamically from the input optical signal 600 so that the overall arrangement is tunable.

A further example of a partially tunable demultiplexer is provided in FIG. 6B. The input optical signal 600 is again provided to a WRE 612, which is configured to preselect the desired M spectral bands from the input optical signal 600 and to provide them to one of the WRE output ports on optical signal 618. This optical signal 618 is provided to a series arrangement of fixed-wavelength band filters 614. Each of the fixed-wavelength band filters 614 is configured to select a desired one of the spectral bands from optical signal 618 and to direct a signal 617 containing only that spectral band to a receiver. At the same time, each of the fixed-wavelength band filters 614 transmits an optical signal 619 containing the spectral bands not contained in signal 617 to the next fixed-wavelength band filter 614 in the series arrangement.

FIG. 6C provides a schematic example of an optical arrangement similar to that provided in FIG. 6B, but uses a plurality of tunable wavelength band-filters configured in series, and a plurality of such series configured in parallel. This combination permits greater flexibility in assigning specific spectral bands to desired output signals by using the tunability of the wavelength band filters. The desired M spectral bands are selected by the WRE 620 from the input optical signal 600 and directed along signal 626 to a serial arrangement of splitters 622. Substantially the same signal is provided to each series arrangement of tunable wavelength band-filters 622. As shown, a first equivalent signal 626' is provided from the first splitter 622(1) to the first series of tunable wavelength band-filters 624. A second equivalent signal 626" from the first splitter 622(1) is provided to the second splitter 622(2), from which a third equivalent signal 626''' is provided to the second series of tunable wavelength band-filters 624.

Within each of the series, each tunable wavelength band filters 624 is configured to select one of the desired spectral bands to a receiver 628, with the remaining spectral bands being transmitted to the next tunable wavelength band filter 624 in the series. The signal transmitted through the series of band filters 624 thus progressively loses another one of the spectral bands on each encounter with a band filter 624. For example, in the first series, signal 626' is equivalent to signal 626, but signal 630 has one spectral band dropped, signal 631 has two spectral bands dropped, and signal 632 has three spectral bands dropped. Similarly, signal 626''' is equivalent to signal 626, but signal 633 has one spectral band dropped, signal 634 has two spectral bands dropped, and signal 635 has three spectral bands dropped.

It is noted that the serial arrangement of splitters 622 may affect signal strengths at the receivers 628. Thus, in some embodiments, some of the splitters 622 may be configured to provide unequal strengths are their outputs so that the signal strengths at the receivers are substantially equal. For example, if only two splitters are used as shown in FIG. 6C, one embodiment uses a 66.7%/33.3% splitting at the first splitter 622(1) and a 50%/50% splitting at the second splitter 622(2) so that substantially equal 33.3% signal strength is propagated along each series of tunable wavelength band filters 624.

b. Optical Arrangements Having Tunable Narrow-Band Filters

Figure 7A:
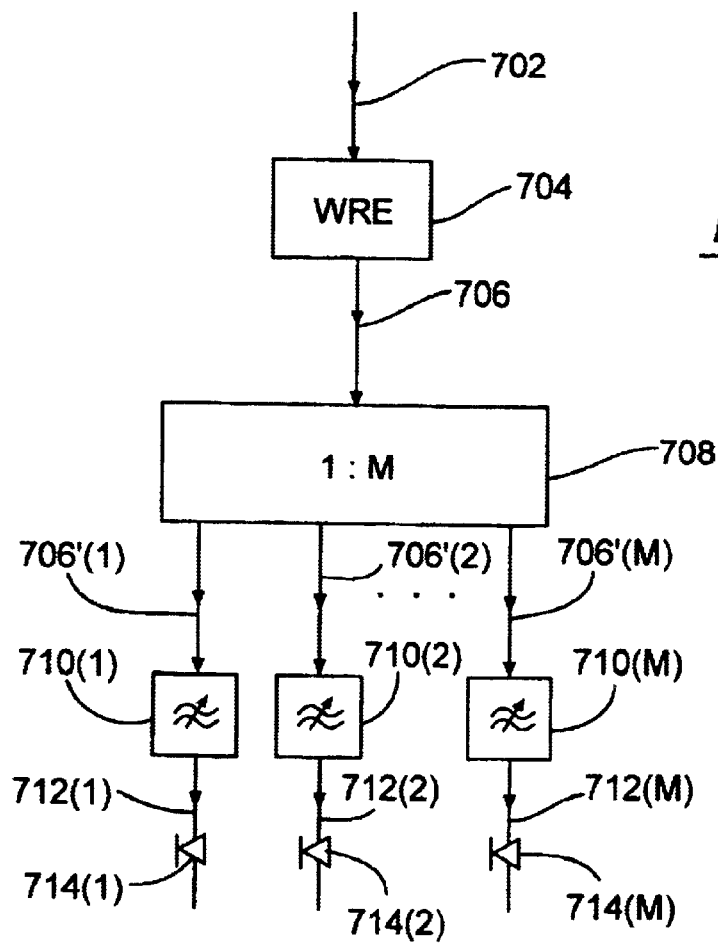
FIGS. 7A–7D provide schematic illustrations of embodiments for a tunable demultiplexer according to the invention having optical arrangements using tunable narrow- band filters.

FIGS. 7A–7D provide examples of fully tunable demultiplexers that use an optical arrangement having a plurality of tunable narrow-band filters. In FIG. 7A, a multiplexed optical signal 702 is provided to an input port of a WRE 704. The WRE 704 is configured to select the desired M spectral bands from the input optical signal 702 and to direct them from one of its output ports along signal 706 to a 1:M power splitter 708. The power splitter 708 splits the signal 706 into a plurality of equivalent signals 706', each of which is directed to a tunable narrow-band filter 710. Each of the tunable narrow-band filters 710 is configured to select a particular one of the spectral bands from the respective signals 706' to provide a signal 712 having only that spectral band. Signals 712 are subsequently directed to receivers 714 where they may be converted to electrical signals. In some embodiments, some of the tunable narrow-band filters 710 may also be used as an alternative to excluding certain spectral bands by tuning them so that they do not select those spectral bands.

Figure 7B:
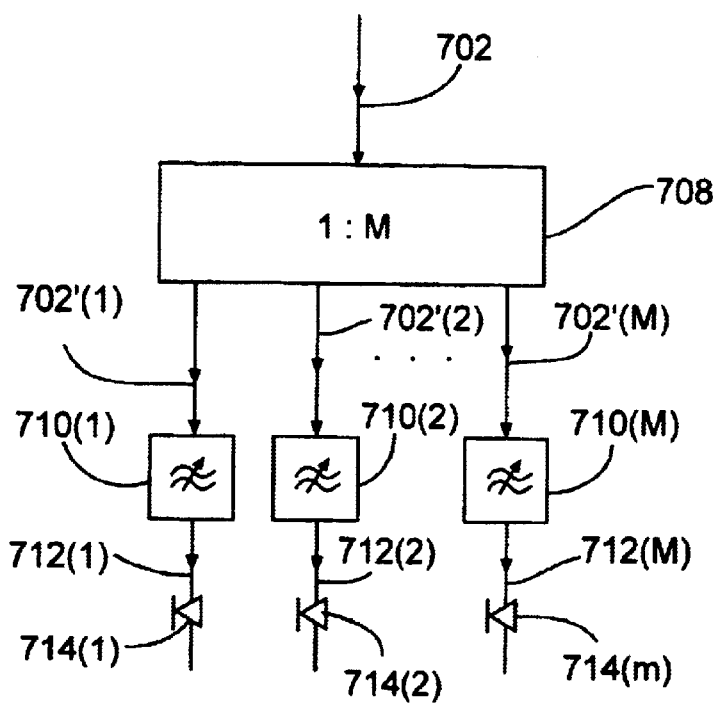

In some instances, the WRE 704 may be eliminated from the system so that the input multiplexed optical signal 702 is provided directly to the 1:M power splitter 708, as shown schematically in FIG. 7B. In that case, each of the signals 702' output from the power splitter 708 are equivalent to the input signal 702 and include all spectral bands. When these output signals 702' are then filtered by the tunable narrow-band filters 710, a single one of the spectral bands is still selected to provide signals 712. Provided that the filter bands comprised by the tunable narrow-band filters 710 are sufficiently narrow, the arrangements of both FIGS. 7A and 7B provide the same level of tunability. The ability to use the tunable narrow-band filters 710 to exclude certain spectral bands in this embodiment may be more useful because it lacks a WRE to perform any preselection. Specifically, even though the structure is shown having M outputs, the tunable narrow-band filters 710 may be tuned so that signals are provided only on a subset (<M) of those outputs.

Figure 7C:
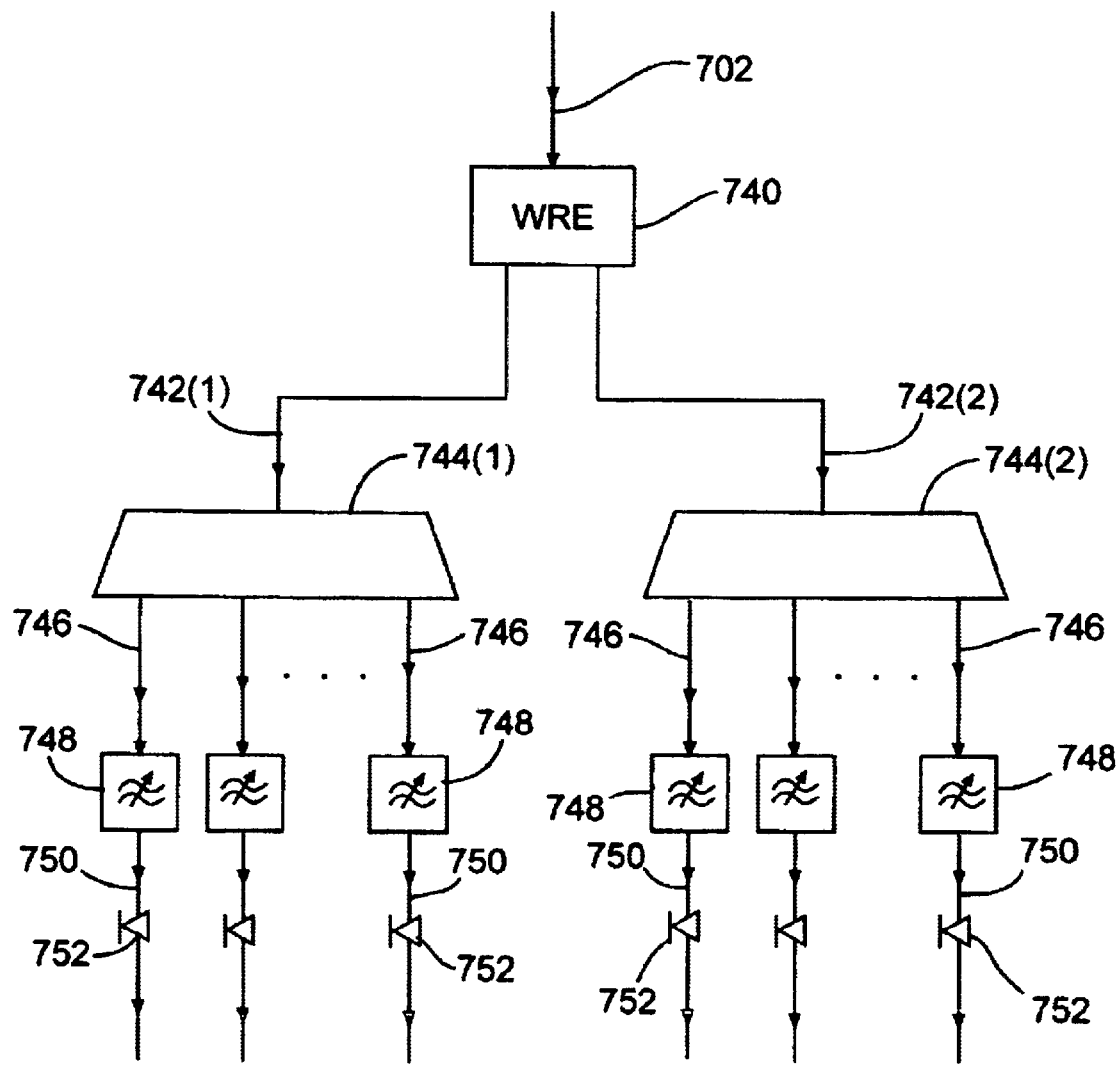

FIG. 7C provides an example of a tunable demultiplexer that uses a combination of passive wideband filters and tunable narrowband filters in combination with a WRE. The multiplexed optical signal 702 is provided to an input port of the WRE 740, which is configured to direct the desired M spectral bands on a plurality of output signals 742 to passive wideband filters 744. Each of the passive wideband filters 744 in turn propagates output signals 746 to individual tunable narrow-band filters 748 to select the individual spectral bands and propagate them on signals 750 to receivers 752 for conversion into electrical signals. In an alternative embodiment, one or more of the passive wideband filters 744 may be substituted with tunable wideband filters. Also, in certain embodiments, the tunable narrowband filters may be substituted with passive narrowband filters.

Figure 7D:
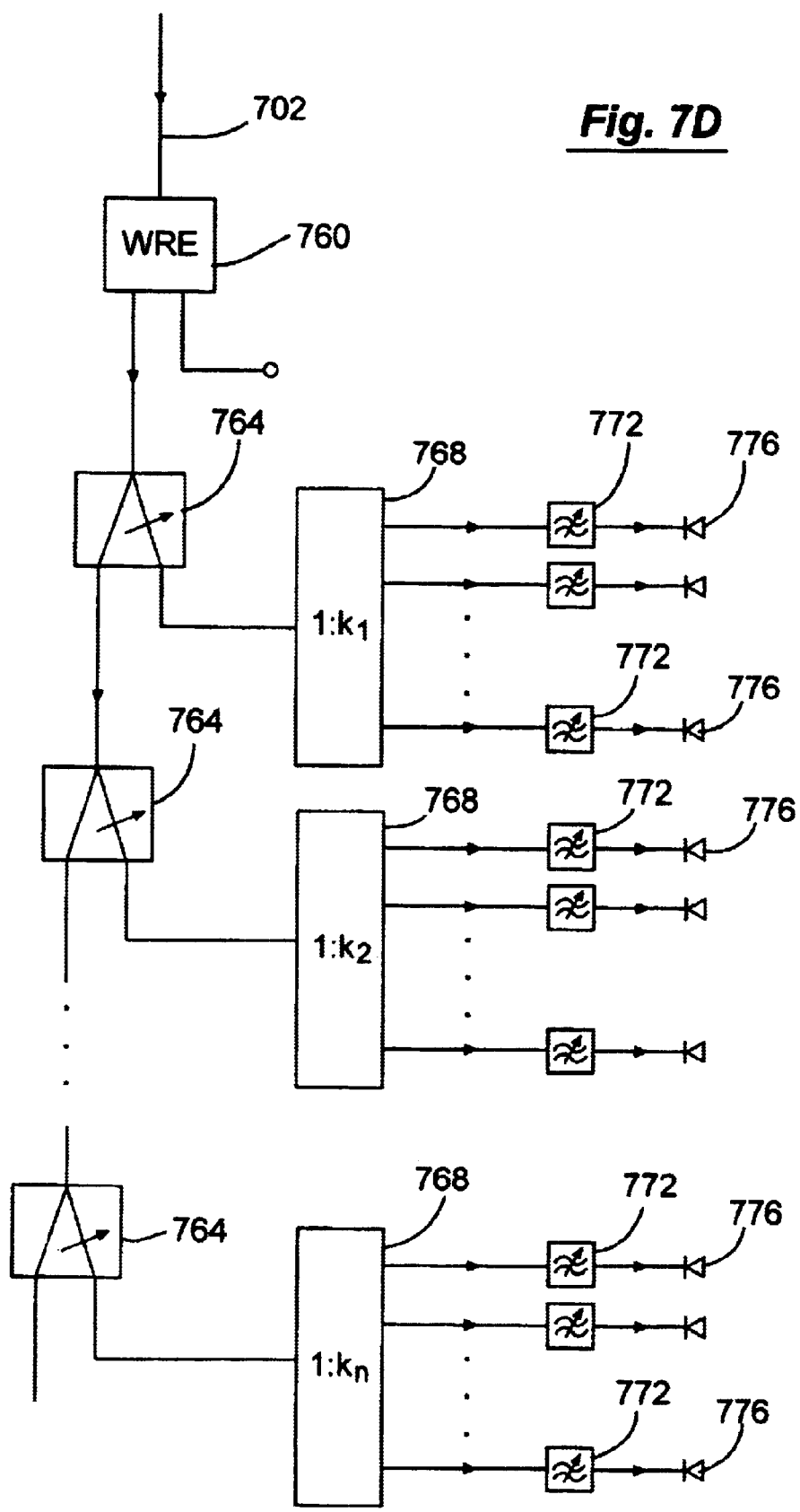

FIG. 7D provides an example of a tunable demultiplexer that uses a combination of tunable wideband filters and tunable narrowband filters. As shown in FIG. 7D, a WRE 760 is disposed to direct the desired M spectral bands from a multiplexed optical signal 702 to a plurality of tunable wavelength band filters 764 arranged serially. Such a serial arrangement functions similarly to the serial arrangements of tunable filters described with respect to FIG. 6C. Each of the tunable wavelength band filters 764 acts to select a portion of the signal for direction to on optical splitter 768, with the remainder of the signal being propagated to the next tunable wideband filter in the series. Each of the optical splitters divides the received signal into a plurality of equivalent signals so that a tunable narrowband filter 772 may select the desired spectral band for conversion to an electrical signal by a receiver 776. In some embodiments, different numbers of spectral bands may be directed to the individual optical splitters 768, which may thus be differently configured to accommodate splitting into different numbers of equivalent signals. In some embodiments, the tunable wavelength band filters 764 may be substituted with passive wideband filters. In other embodiments, the tunable narrowband filters 772 may be substituted with passive narrowband filters.

c. Optical Arrangements Having Tunable Wideband Filters

Figure 8:
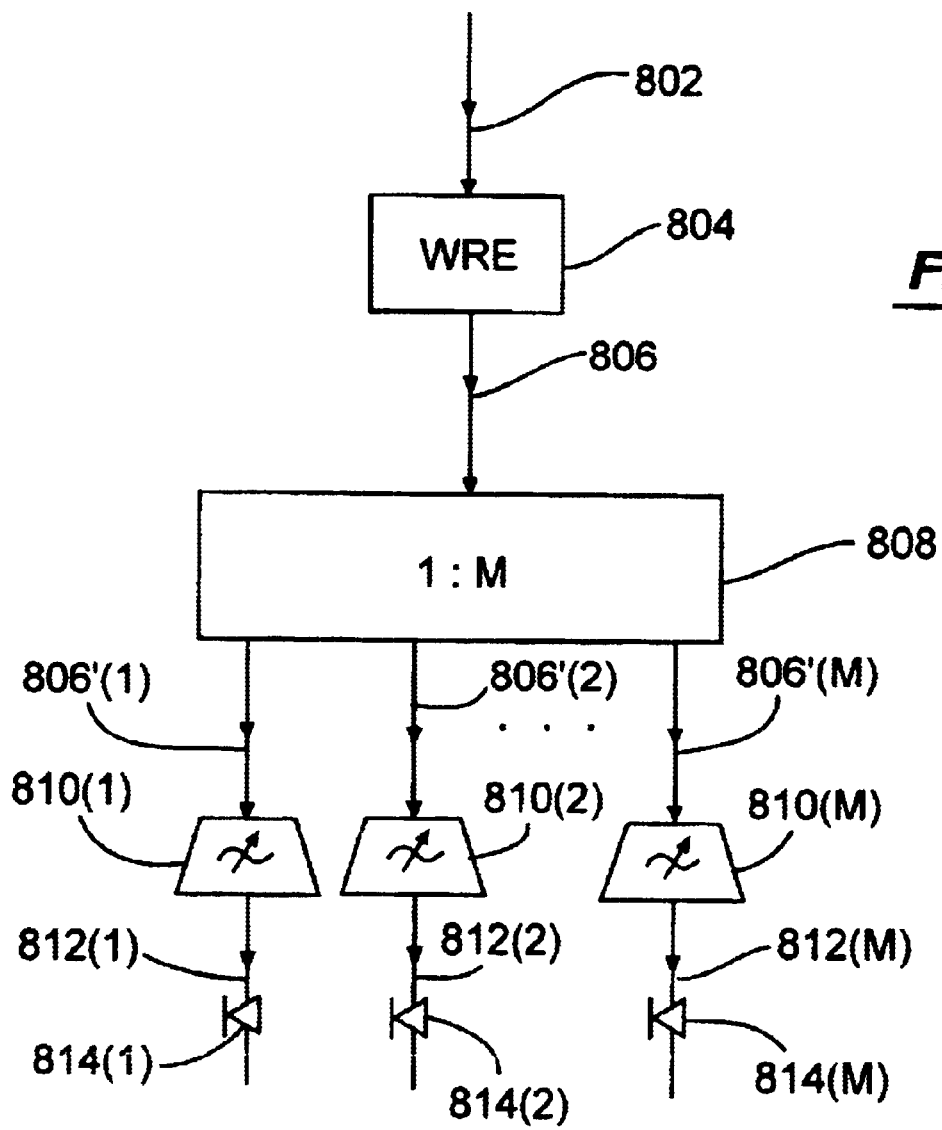
FIG. 8 provides a schematic illustration of an embodiment for a tunable demultiplexer according to the invention having an optical arrangement using a tunable wideband filter.

FIG. 8 provides an example of a system in which a WRE is connected with an optical arrangement that uses tunable wideband filters to achieve tunable demultiplexing. The desired M spectral bands are selected from the input multiplexed optical signal 802 by the WRE and provided on an optical signal 806 to a 1:M power splitter 808. The power splitter 808 produces M equivalent signals 806', each of which is directed to a tunable wideband filter 810 configured to extract a specific one of the M spectral bands The filtered signals 812 may then be provided to receivers 814 in specific applications.

d. Arrangements Having a Space Switch

Figure 9A:
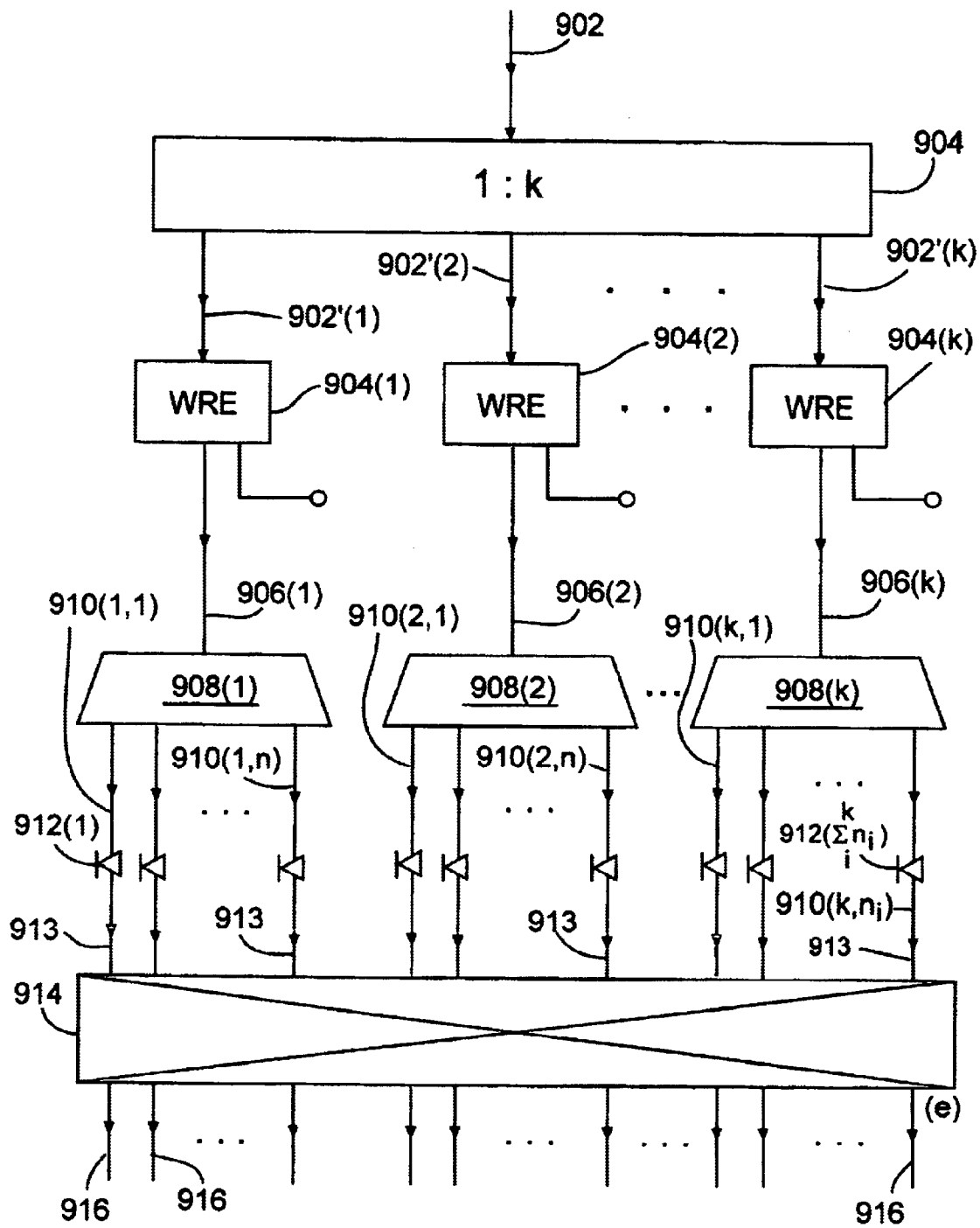
FIGS. 9A–9D provide schematic illustrations of embodiments for a tunable demultiplexer according to the invention that use space switches.

FIGS. 9A–9D provide several examples of embodiments that permit full tunability of the demultiplexer by incorporating space-switch elements. FIG. 9A provides a first example in which an electrical space switch 914 is used. The input multiplexed optical signal 902 is split into a plurality k of equivalent multiplexed signals 902' by a 1:k optical power splitter 904. Each of the equivalent multiplexed signals 902' is initially treated by the system in a fashion similar to the treatment of the input multiplexed optical signal 802 described with respect to FIG. 8. Thus, each equivalent multiplexed signal 902'(i) is provided to a WRE 904(i) configured to select $n_i$ of the spectral bands and to propagate them on signal 906(i). For a system in which M of the spectral bands are ultimately to be provided in a demultiplexed fashion, the constraint $$\sum_{i=1}^{k} n_i = M$$

may be met.

Each of signals 906(i) is propagated to a wideband filter 908(i), which is shown as a passive wideband filter. The wideband filter 908(i) selects each of the $n_i$ spectral bands for a separate optical signal 910(i, 1 . . . $n_i$). While the configuration of the wideband filters 908 requires that optical signals 906 include widely separated spectral bands, the existence of a plurality of such wideband filters 908 permits any combination of desired M spectral bands to be demultiplexed onto individual optical signals 910. In one embodiment, such a result is ensured by using a number k of WREs 904 and wideband filters 908 that is at least as great as the number of spectral bands that may pass through each filter band; i.e., if the spectral bands are separated by frequency $\Delta v$ and the filter bands have frequency widths w, $k \geq w/\Delta v$.

The set of demultiplexed optical signals 910(i=1 . . . k, 1 . . . $n_i$) thereby comprises a set of M demultiplexed signals, each of which is then propagated to a respective receiver 912 to be converted to an electrical signal 913. The M electrical signals 913 are provided to an electrical space switch 914, which may be configured to provide any mapping of the M electrical signals 913 to a set of M output signals 916, thereby achieving full tunability.

Figure 9B:
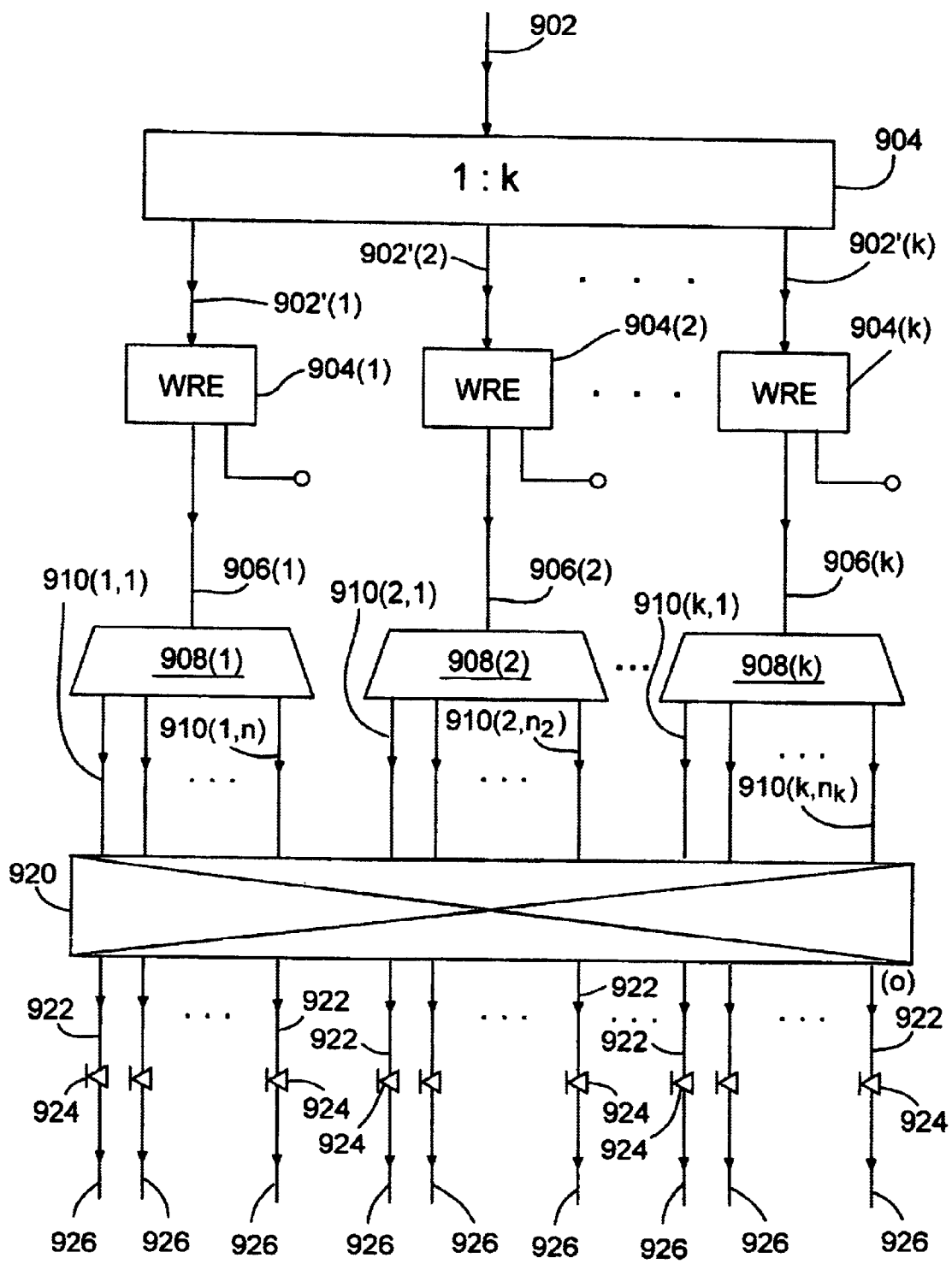

A similar demultiplexer that is fully tunable is shown schematically in FIG. 9B and uses an optical space switch 920 in place of the electrical space switch 914 used in FIG. 9A. The system of FIG. 9B functions in the same manner as the system of FIG. 9A up to the demultiplexing of input optical signal 902 into M demultiplexed optical signals 910 by using a plurality of WREs 904 and a plurality of wideband filters 908. In this embodiment, the demultiplexed optical signals 910 are provided to the optical space switch 920, which may be configured to provide any mapping of the M optical signals 910 to a set of M optical output signals 922. The set of optical output signals 922 thereby defines an arbitrarily tuned set of demultiplexed signals, which may then be provided to receivers 924 for conversion to electrical signals 926.

The embodiment of FIG. 9B has the advantage that the demultiplexed optical signals may be arbitrarily tuned, while the embodiment of FIG. 9A requires that tuning be completed after conversion to electrical signals. Currently, however, electrical space switches that are commercially available are both larger and less costly than corresponding optical space switches. Accordingly, FIGS. 9C and 9D provide illustrations of embodiments that make use of smaller optical space switches.

Figure 9C:
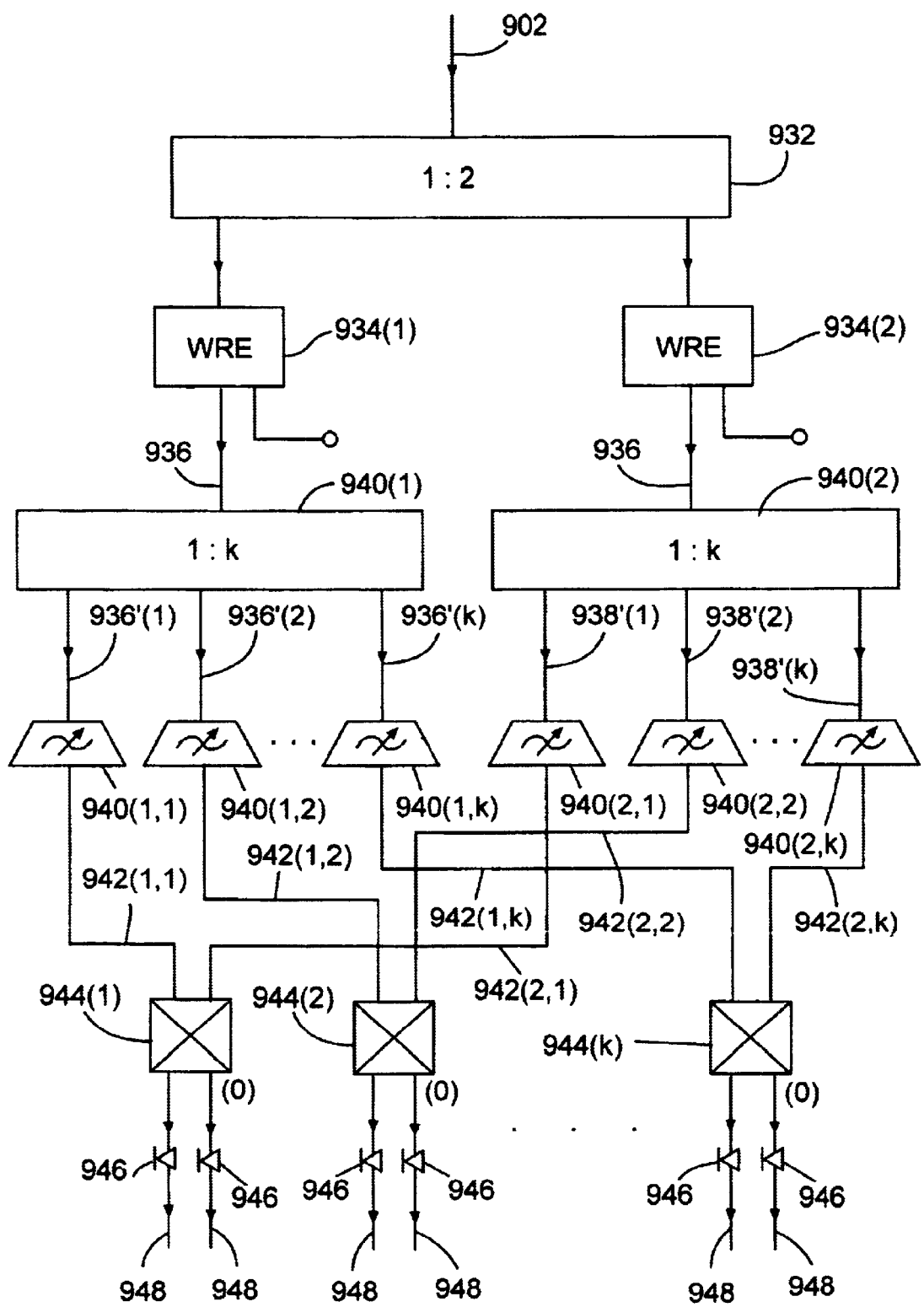
Figure 9D:
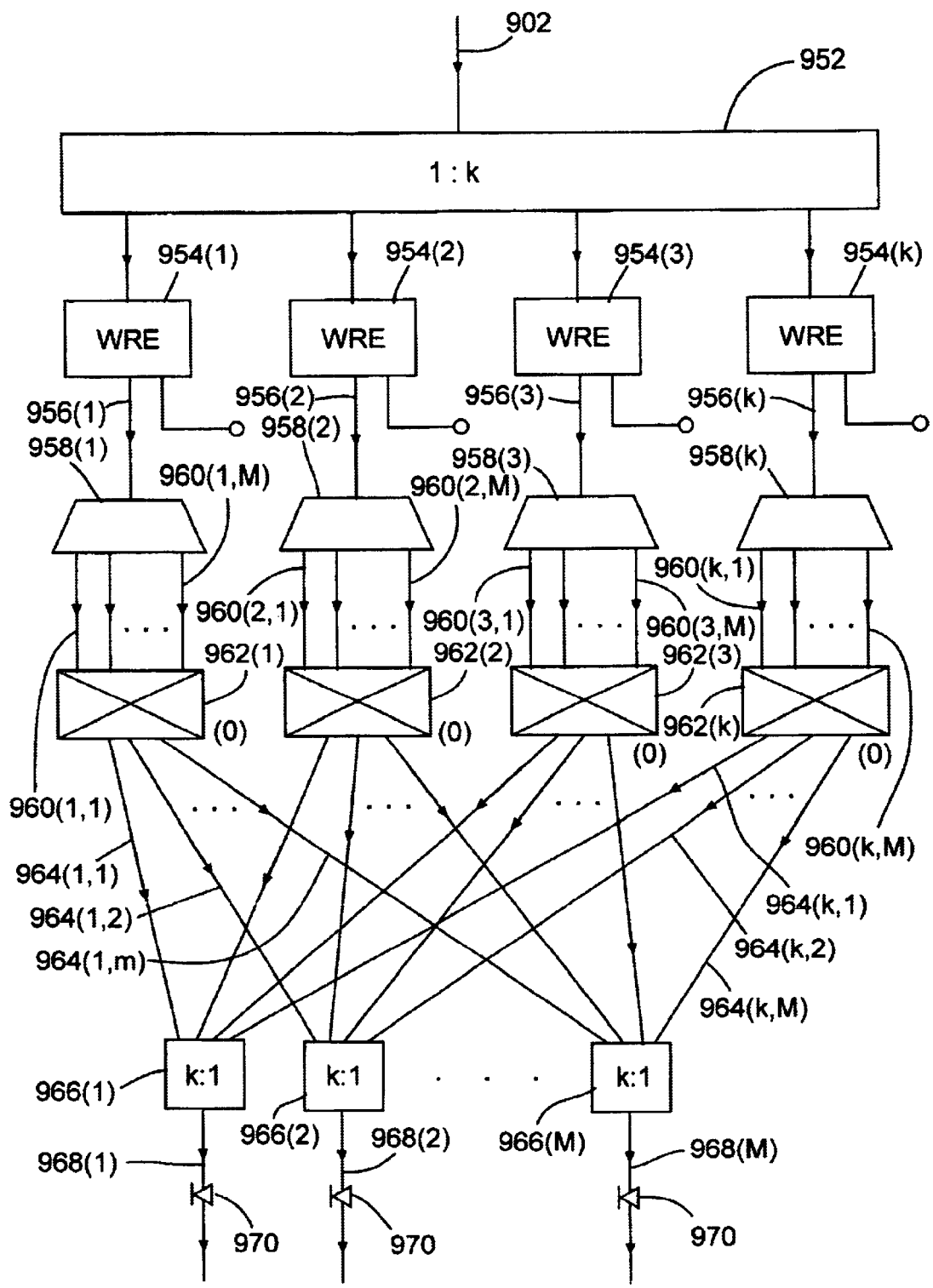

In the embodiment illustrated by FIG. 9C, the input multiplexed optical signal 902 is first divided into two equivalent signals by an optical power splitter 932, each equivalent signal being directed to a WRE 934. Each of the WREs 934 is configured to select at least M/2 distinct spectral bands for propagation as optical signals 936 and 938. The resultant two sets of spectral bands are initially treated distinctly. Thus, optical signal 936 is divided into k=M/2 equivalent optical signals 936' by optical power splitter 940(1, . . . ), with each of the equivalent optical signals 936' being directed to a tunable wideband filter 940. The tunable wideband filters 940(1, . . . ) are each configured to select a single spectral band for optical signals 942(1, . . . ) so that the first set of M/2 spectral bands are demultiplexed. Optical signal 938 is similarly divided into k=M/2 equivalent optical signals 938' by optical power splitter 940(2, . . . ), with each of the equivalent optical signals 938' being directed to a tunable wideband filter 940. The tunable wideband filters 940(2, . . . ) are each configured to select a single spectral band for optical signals 942(2, . . . ) so that the second set of M/2 spectral bands are also demultiplexed.

After demultiplexing the two sets of spectral bands, respective optical-signal pairs 942(1, i) and 942(2, i) are provided to a 2×2 optical space switch 944(i). The 2×2 optical space switches 944 permit the demultiplexed signals to be tuned. The tuned signals are subsequently provided to receivers 946 for conversion into electrical signals 948.

It is apparent that the general method of this embodiment may be extended to a larger number of spectral-band groupings by replacing the 1:2 optical power splitter 932 with a 1:j optical power splitter and by substituting each of the 2×2 optical space switches with j×j optical space switches. In addition, k=M/j so that optical power splitters 940 are 1:M/j optical power splitters. The method otherwise proceeds in the same fashion as the two-group division with the larger number of groups. In the limit that j→M, the arrangement of FIG. 9C becomes equivalent to the arrangement of FIG. 9B, except that tunable wideband filters 940 have been used in FIG. 9C and passive wideband filters 908 have been used in FIG. 9B.

Another embodiment that uses grouping of the spectral bands is illustrated in FIG. 9D. The input multiplexed optical signal 902 is initially split into k equivalent optical signals with a 1:k optical power splitter 952, with each of the equivalent optical signals being directed to a WRE 954. Each of the WREs 954 is configured to select one or more of the spectral bands from the equivalent optical signals and to provide the selected spectral bands on optical signals 956. The set of optical signals 956(1, . . . , k) is complete in the specific sense that each of the desired M spectral bands to be demultiplexed is present on exactly one of the optical signals 956. In one embodiment, the desired M spectral bands are evenly distributed among the optical signals 956(1, . . . , k), but this is not a requirement.

Each of the optical signals 956 is propagated to a wideband filter 958, which is shown as a passive wideband filter. Each wideband filter 958 is similarly configured for selection of the M desired spectral bands so that at least some of the optical signals 960 exiting from the wideband filter will carry no spectral bands. For full tunability, the configuration of the wideband filters 958 may be configured so that optical signals 956 include widely separated spectral bands. Thus, in one such embodiment, the number k of WREs 954 and wideband filters 958 is at least as great as the number of spectral bands that may pass through each filter band; i.e., if the spectral bands are separated by frequency $\Delta v$ and the filter bands have frequency widths w, $k \geq w/\Delta v$. In other embodiments, $k < w/\Delta v$ so that the arrangement provides partial tunability.

The total number of resulting optical signals 960 is kM, of which only M carry any of the desired spectral bands. To effect tunability of the system, each grouping of optical signals 960(i, 1 . . . M) is provided to an M×M optical space switch 962(i) that redistributes the incoming arrangement onto output optical signals 964(i, 1 . . . M). Each output optical signal 964 from a given optical space switch is directed to a different one of M k:1 optical combiners 966. The redistribution of the optical signals effected by the optical space switches is such that only one of the signals received by a given k:1 optical combiner includes one of the M desired spectral bands. Accordingly, the optical signals 968 resulting from the combinations comprise a dynamically tuned set of the desired M spectral bands, the tuning depending on the configurations of the WREs 954 and optical space switches 962.

e. Optical Tree Arrangements

Figure 10A:
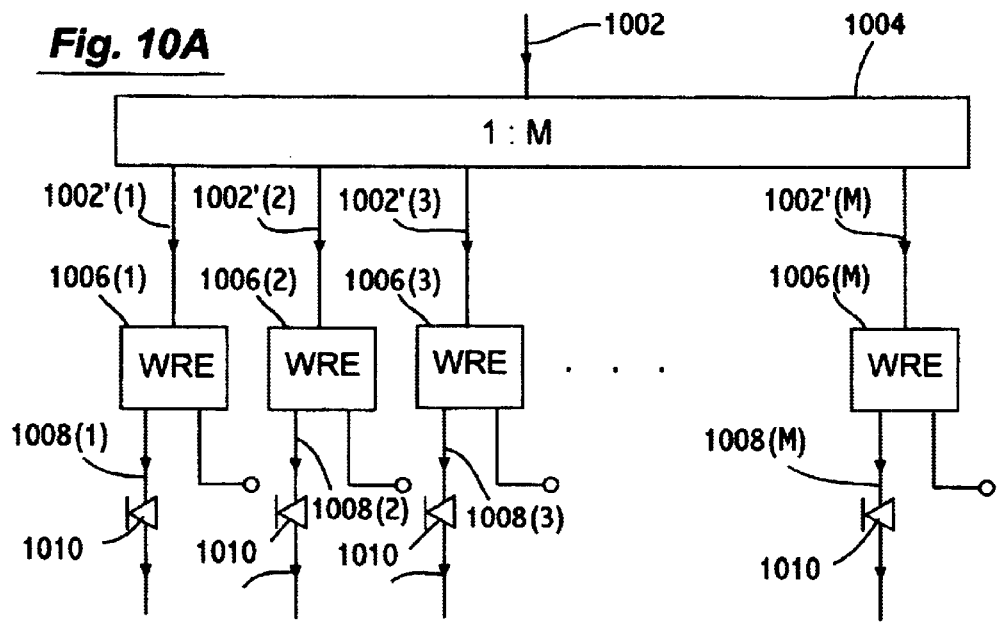
FIGS. 10A–10E provide schematic illustrations of embodiments for a tunable demultiplexer according to the invention that use tree optical arrangements.

FIGS. 10A–10E provide examples of several embodiments of the invention that use optical tree arrangements, including a WRE tree arrangement, to effect tunable demultiplexing. In FIG. 10A, the input multiplexed optical signal 1002 is split into M equivalent optical signals 1002' with a 1:M optical power splitter 1004. Each of the equivalent optical signals 1002' is provided to its own WRE 1006, which is configured to select a specific one of the desired M spectral bands and to present that desired spectral band on respective optical signal 1008. The resulting set of output optical signals 1008 comprises a set of tuned demultiplexed spectral bands and may then be converted to electrical signals by directing the output optical signals 1008 to respective receivers 1010.

Figure 10B:
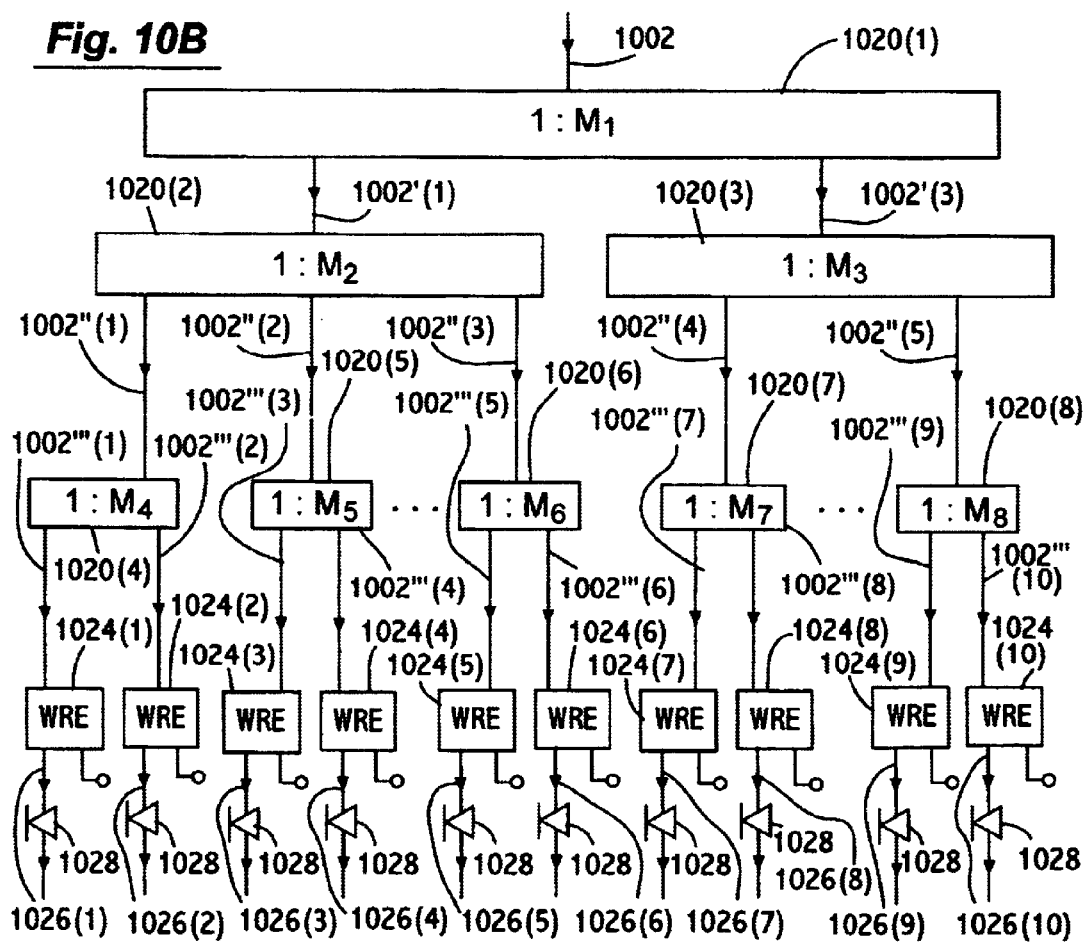

The embodiment illustrated in FIG. 10B is functionally similar to the embodiment illustrated in FIG. 10A, except that the optical power splitter 1004 has been substituted with a plurality of optical power splitters 1020 arranged as a tree. Each of the optical power splitters 1020 produces a plurality of signals(denoted 1002', 1002'', and 1002''' in the example) equivalent to the input multiplexed signal 1002. The result of the tree of splitters 1020 is to produce M(=10 in the example) equivalent signals that are each directed to a respective WE 1024. As for the embodiment described with respect to FIG. 10A, each WRE 1024 is configured to select a specific one of the desired M spectral bands and to present that desired spectral band on respective optical signal 1026. The resulting set of output optical signals 1026 comprises a set of tuned demultiplexed spectral bands and may then be converted to electrical signals by directing the output optical signals 1026 to respective receivers 1028.

Figure 10C:
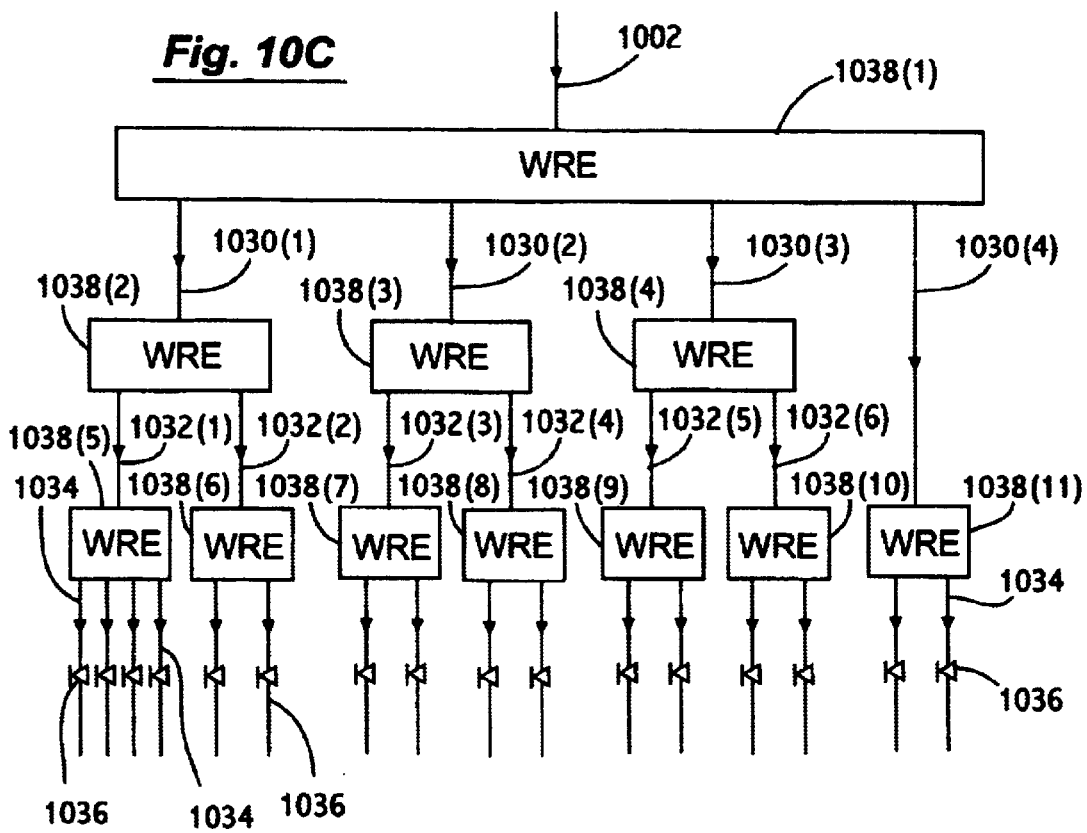

The embodiment illustrated in FIG. 10C differs from the embodiment of FIG. 10B since not every spectral band from the input multiplexed optical signal 1002 is propagated to every WRE on the lowest level of the tree. This is achieved by using WREs 1038 instead of optical power splitters in forming the tree. The specific embodiment shown in FIG. 10C also illustrates that a combination of different types of WREs may by used within the tree and certain levels of the tree may not be populated for some branches, both of these characteristics depending on the desired demultiplexing functions. For example, the specific embodiment is shown using two 1×4 WREs and nine 1×2 WREs, and with one of the lowest-level WREs connected directly to the top level of the tree but with the other lowest-level WREs connected to an intermediate level of the tree.

Thus, the input multiplexed optical signal 1002 is parsed at the top level of the tree into a plurality of optical signals 1030, each of which includes some of the M desired spectral bands. Some of these are further parsed at an intermediate level of WREs to optical signal 1032, and perhaps also at additional intermediate tree levels. At the lowest tree level, the WREs provide optical signals 1034 that each include a single one of the desired spectral bands. The arrangement thereby provides a set of tuned demultiplexed optical signals 1034 that may be converted to electrical signals by directing them to respective receivers 1036.

Figure 10D:
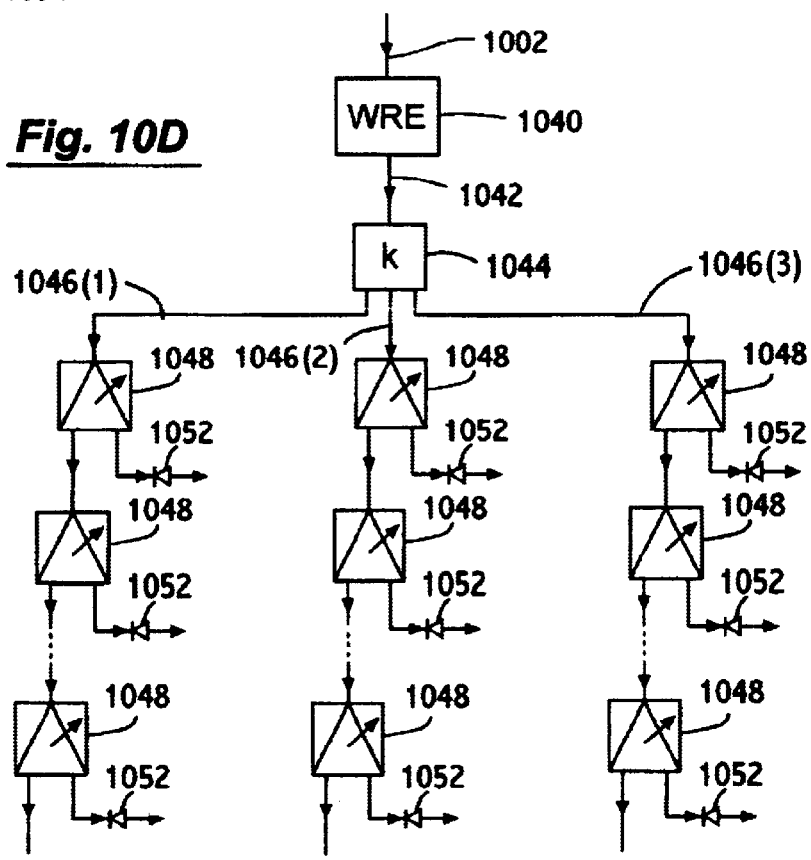

FIG. 10D provides a demultiplexing arrangement that includes a WRE and an optical arrangement having an optical interleaver. The figure depicts a generalization in which the optical arrangement comprises a k-state optical interleaver. A WRE 1040 is positioned to select the M desired spectral bands from the input multiplexed signal 1002 and to direct an optical signal that includes the M desired spectral bands to the k-state optical interleaver 1044. The effect of the optical interleaver 1044 is to provide optical signals 1046 having sufficiently separated spectral bands that they may be selected by a series of wideband filters 1048. The selection of individual spectral bands is achieved with a series arrangement of wideband filters 1048 is a manner similar to that described with respect to FIG. 6C. In particular, within each series, a signal is transmitted to successive wideband filters 1048 and contains progressively fewer spectral bands as they are selected out by the wideband filters 1048.

The wideband filters 1048 are shown as tunable wideband filters but may comprise passive wideband filters in alternative embodiments. The resulting set of optical signals thus comprises a set of M demultiplexed spectral bands, each provided individually on an optical signal and are shown in the figure as converted to electrical signal by receivers 1052. In alternative embodiments, an electrical or optical space switch may additionally be used as described with respect to FIGS. 9A and 9B to redistribute the signals. Where an electrical space switch is used, the electrical signals from the receivers are provided to the space switch and redistributed. Where an optical space switch is used, the optical signals from the wideband filters 1048 are directed to the space switch for redistribution, and the redistributed optical signals are then converted to electrical signals with receivers. It will also be evident to those of skill in the art that optical interleavers may also be incorporated into the general optical-space-switch arrangements described with respect to FIGS. 9C and 9D.

Figure 10E:
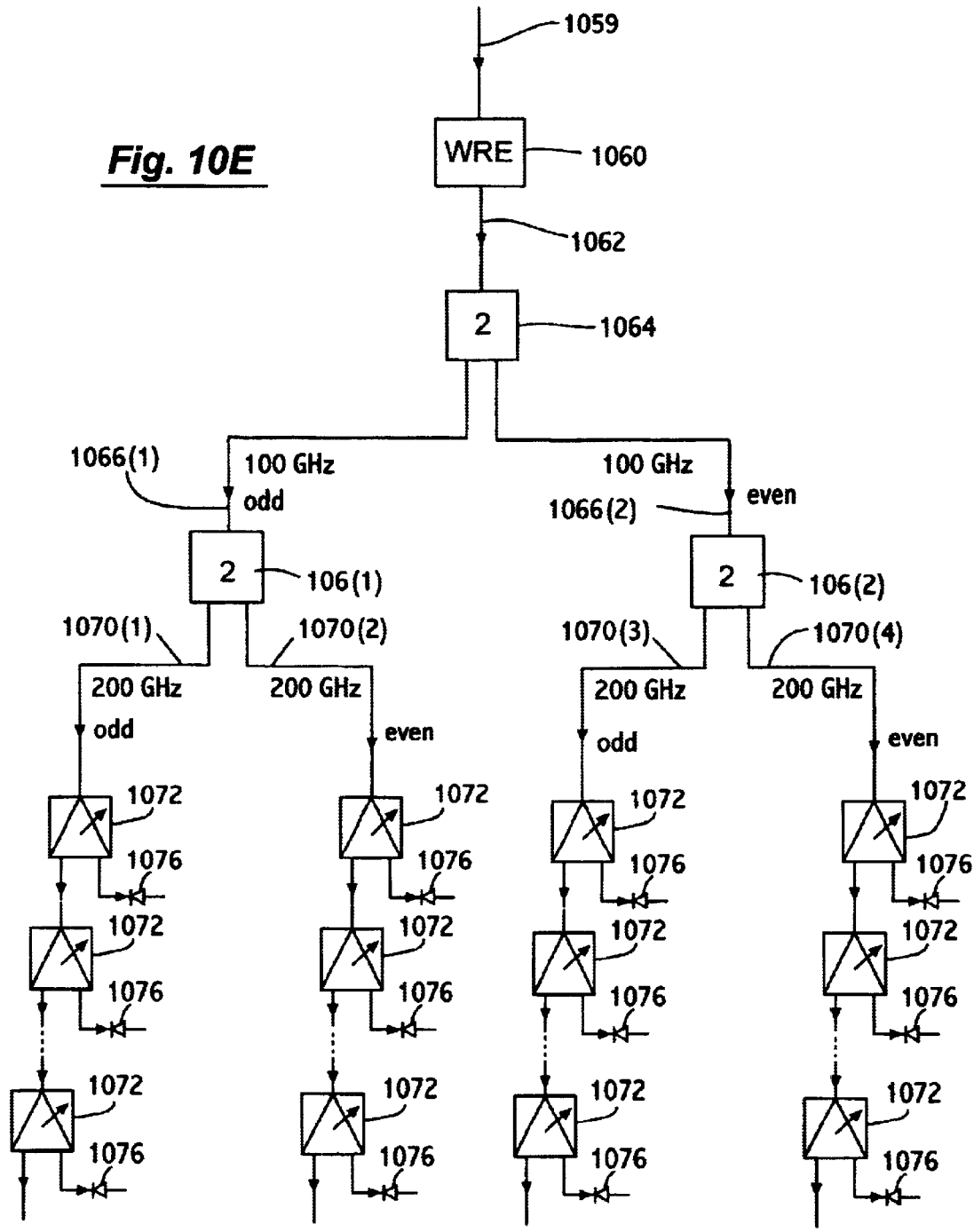

FIG. 10E provides an example of an embodiment that uses a plurality of optical interleavers arranged in tree fashion. The example illustrates the more general principles used with a specific illustration of tunably demultiplexing an input optical signal 1059 having spectral bands spaced at substantially 50 GHz intervals. The desired M spectral bands are selected by a WRE and propagated to a top-level optical interleaver 1064 with optical signal 1062. In the example, the top-level optical interleaver 1064 comprises a two-state optical interleaver with 100-GHz filter bands so that odd channels 1, 3, 5, . . . are propagated along signal 1066(1) and even channels 2, 4, 6, . . . are propagated along signal 1066(2).

Each of signals 1066 subsequently encounters a lower-level optical interleaver 1068 having filter bands wider than the filter bands of the top-level optical interleaver 1064. In certain embodiments, the width of any lower-level optical interleaver within the tree is substantially equal to an integral multiple of the width of its preceding optical interleaver. In the specific example shown in FIG. 10E, each of the lower-level optical interleavers 1068 comprises a two-state optical interleaver with 200-GHz filter bands. The resulting channel distribution on optical signals 1070 is: 1, 5, 9, . . . on signal 1070(1); 3, 7, 11, . . . on signal 1070(2); 2, 6, 10, . . . on signal 1070(3); and 4, 8, 12, . . . on signal 1070(4). More generally, the optical interleaver tree may include higher- and different-state optical interleavers and may have branches in which more or fewer optical interleavers are included than in other branches, depending on the application.

The result of filtering by the optical interleaver tree is a set of optical signals 1070 having spectral bands sufficiently separated for individual selection by series arrangements of respective wideband filters 1072. In the example of FIG. 10E, the wideband filters are shown as tunable wideband filters, although alternative embodiments may use passive wideband filters. Similarly to the series of wideband filters in FIG. 10D, the arrangement acts progressively to select out specific spectral bands from the signal and to propagate a signal absent the selected spectral bands along the arrangement. Accordingly, the arrangement provides a set of demultiplexed optical signals, which are shown in the figure as being converted to electrical signals with receivers 1076. It is noted that the tree arrangement of interleavers may permit wider filters to be used than in a comparable arrangement in FIG. 10D. In certain alternative embodiments, an optical or electrical space switch may be added to effect redistribution of the signals, either of the demultiplexed optical signals themselves or of the converted electrical signals, as previously described. It will also be evident to those of skill in the art that an optical interleaver tree as described above may also be incorporated into the general optical-space-switch arrangements described with respect to FIGS. 9C and 9D.

f. Optical Arrangements with Wide Filter Band Overlap

Figure 11A:
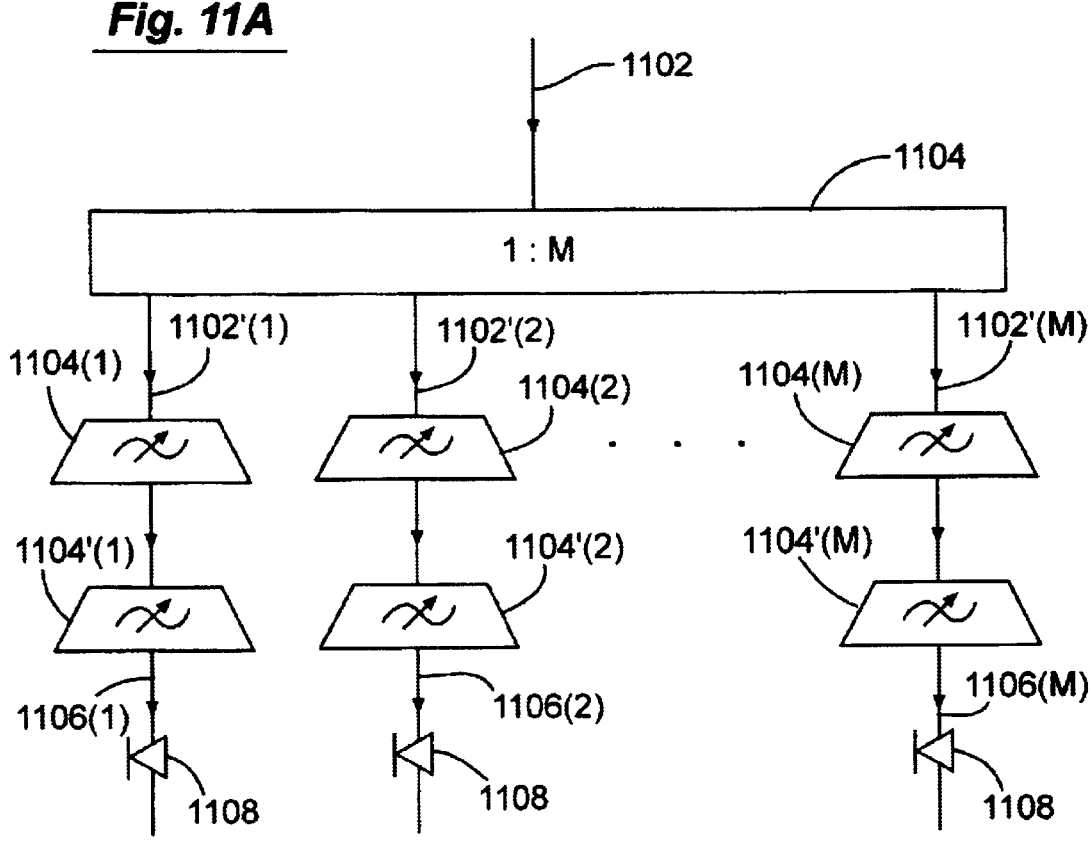
FIGS. 11A and 11B provide schematic illustrations of embodiments for a tunable demultiplexer according to the invention that use serial arrangements of tunable wideband filters.
Figure 11B:
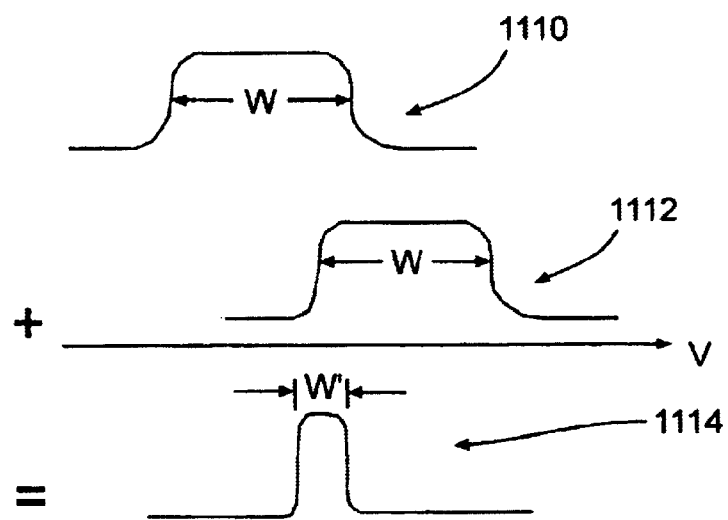

FIGS. 11A and 11B provide an illustration of an embodiment of the invention similar to the embodiment described with respect to FIG. 7B, except that the function of the tunable narrowband filters 710 is effectively reproduced with tunable wideband filters 1104. Thus, a multiplexed input optical signal 1102 is first split into a plurality M of equivalent signals 1102' with a 1:M power splitter 1104. Each of the equivalent power optical signals 1102' is then propagated to a series of at least two tunable wideband filters 1104 and 1104'. In one embodiment, the serial tunable wideband filters 1104 and 1104' have substantially the same filter band widths, but this is not a requirement.

Each series of tunable wideband filters 1104 and 1104' is configured so that the bands overlap over a narrow frequency(or, equivalently, wavelength) range so that the combination acts as a tunable narrowband filter. Such an arrangement may exploit cost advantages of commercially available wideband filters over narrowband filters. The effect is illustrated in FIG. 11B. The first wideband filter 1104 is tuned to have a first frequency profile 1110 and the second wideband filter 1104' is tuned to have a second frequency profile 1112 that is offset from the first frequency profile 1112. The effect of passing light through the two wideband filters 1104 serially is equivalent to passing it through a narrowband filter tuned to have a filter band corresponding to the overlap, shown by effective frequency profile 1114.

After passing each of the equivalent optical signals 1102' through the tunable wideband filter arrangement, a set of demultiplexed signals 1106 is produced, each such signal 1106 carrying only one the desired M spectral bands. This set of demultiplexed optical signals may be converted to electrical signals with receivers 1108 if necessary for particular applications.

The optical arrangement shown in FIG. 11A, like the optical arrangement of FIG. 7B, uses equivalent signals 1102' that include all spectral bands present in the input multiplexed optical signal 1102. In an alternative embodiment, the input signal 1102 is first propagated to a WRE configured for extracting only those M spectral bands of interest. The resulting preprocessed optical signal is provided to the optical arrangement of FIG. 11A instead of the full optical signal 1102. Such an embodiment may be considered to be similar to the embodiment shown in FIG. 7A with tunable narrowband filters 710 substituted by the serial arrangement of tunable wideband filters. The resulting set of demultiplexed signals 1106 are substantially the same in both embodiments.

Having described several embodiments, it will be recognized by those of skill in the art that various modifications, alternative constructions, and equivalents may be used without departing from the spirit of the invention. In particular, a number of examples have been provided illustrating discrete principles. Alternative embodiments may include elements in arrangements that use multiple of those principles. Accordingly, the above description should not be taken as limiting the scope of the invention, which is defined in the following claims.

What is claimed is:

1. A tunable demultiplexer for demultiplexing an input optical signal having a plurality of spectral bands onto a plurality of output signals, each output signal corresponding to a selected one or more of the spectral bands, the tunable demultiplexer comprising:

at least one wavelength routing element adapted for selectively routing wavelength components of a first optical signal onto a plurality of second optical signals according to a configurable state of the wavelength routing element; and at least one configurable optical arrangement disposed to exchange light with the at least one wavelength routing element, wherein a correspondence of a subset of the spectral bands to the plurality of output signals is determined by a state of the at least one configurable optical arrangement.

2. The tunable demultiplexer recited in claim 1 wherein the at least one configurable optical arrangement comprises:

an optical power splitter; and a plurality of tunable filters disposed to receive light from the optical power splitter.

3. The tunable demultiplexer recited in claim 2 wherein the optical power splitter is disposed to receive one of the second optical signals from the at least one wavelength routing element.

4. The tunable demultiplexer recited in claim 2 wherein the plurality of tunable filters comprise at least one tunable narrowband filter.

5. The tunable demultiplexer recited in claim 2 wherein the plurality of tunable filters comprise at least one tunable wideband filter.

6. The tunable demultiplexer recited in claim 2 wherein the plurality of tunable filters comprises at least one serial pair of tunable wideband filters tuned with a narrow frequency overlap.

7. The tunable demultiplexer recited in claim 1 wherein the at least one configurable optical arrangement includes at least one optical space switch.

8. The tunable demultiplexer recited in claim 7 wherein:

the at least one wavelength routing element comprises a plurality of wavelength routing elements, each such wavelength routing element being disposed to receive an equivalent to the input optical signal and configured to route distinct subsets of desired spectral bands to respective filter elements; and the filter elements are configured to transmit individual spectral bands to the at least one optical space switch.

9. The tunable demultiplexer recited in claim 8 wherein the filter elements comprise tunable filter elements.

10. The tunable demultiplexer recited in claim 8 wherein the at least one optical space switch comprises a plurality of optical space switches, each such optical space switch being disposed to receive one of the spectral bands routed by each of the wavelength routing elements.

11. The tunable demultiplexer recited in claim 8 wherein:

the at least one optical space switch comprises a plurality of optical space switches, each such optical space switch being associated with one of the plurality of wavelength routing elements; and the at least one configurable optical arrangement further includes a plurality of optical combiners, each such optical combiner being configured to receive optical signals from each of the optical space switches and to transmit an optical signal corresponding one of the plurality of output signals.

12. The tunable demultiplexer recited in claim 1 wherein the at least one configurable optical arrangement includes at least one tunable filter element.

13. The tunable demultiplexer recited in claim 12 wherein the at least configurable optical arrangement further includes at least one passive filter element.

14. The tunable demultiplexer recited in claim 13 wherein the at least one passive filter element comprises a wideband filter.

15. The tunable demultiplexer recited in claim 1 wherein the at least one configurable optical arrangement further includes:

at least one optical interleaver disposed to receive one of the second optical signals from the at least one wavelength routing element.

16. The tunable demultiplexer recited in claim 15 wherein the at least one optical interleaver comprises a plurality of optical interleavers arranged as a tree.

17. The tunable demultiplexer recited in claim 15 wherein the at least one configurable optical arrangement further includes a plurality of serial arrangements of tunable wavelength band filters, each such tunable wavelength band filter being adapted to provide a first output that transmits a selected filtered portion of a received optical signal depending on a state of the tunable wavelength band filter and to provide a second output that transmits a remaining portion of the received optical signal, wherein a first tunable wavelength band filter in each of the plurality of serial arrangements is disposed to receive an output from the at least one optical interleaver.

18. The tunable demultiplexer recited in claim 1 wherein:

the at least one configurable optical arrangement includes a plurality of receivers, each such receiver configured for converting an optical signal into an electrical signal; and the plurality of output signals comprises a plurality of electrical output signals.

19. The tunable demultiplexer recited in claim 18 further comprising an electrical space switch disposed to receive the plurality of electrical output signals.

20. The tunable demultiplexer recited in claim 19 wherein:

the at least one wavelength routing element comprises a plurality of wavelength routing elements, each such wavelength routing element being disposed to receive an equivalent to the input optical signal and configured to route distinct subsets of desired spectral bands to respective filter elements; and the filter elements are configured to transmit individual spectral bands to respective ones of the plurality of receivers.

21. The tunable demultiplexer recited in claim 1 wherein the at least one configurable optical arrangement includes at least one optical interleaver disposed to receive one of the second optical signals from the at least one wavelength routing element.

22. The tunable demultiplexer recited in claim 21 wherein the at least one optical interleaver comprises a plurality of optical interleavers arranged as a tree.

23. The tunable demultiplexer recited in claim 1 wherein the at least one configurable optical arrangement comprises at least one additional wavelength routing element.

24. The tunable demultiplexer recited in claim 23 wherein the at least one additional wavelength routing element comprises a plurality of additional wavelength routing elements arranged as a tree.

25. The tunable demultiplexer recited in claim 1 wherein the at least one wavelength routing element comprises a four-pass wavelength routing element.

26. The tunable demultiplexer recited in claim 1 wherein the at least one wavelength routing element comprises a two-pass wavelength routing element.

27. The tunable demultiplexer recited in claim 1 wherein the at least one configurable optical arrangement comprises a plurality of serial arrangements of tunable wavelength band filters, each such tunable wavelength band filter being adapted to provide a first output that transmits a selected filtered portion of a received optical signal depending on a state of the tunable wavelength band filter and to provide a second output that transmits a remaining portion of the received optical signal, wherein at least one of the tunable wavelength band filters in each of the plurality of serial arrangements is configured to receive an equivalent to one of the second optical signals provided by the at least one wavelength routing element.

28. The tunable demultiplexer recited in claim 1 wherein the at least one configurable optical arrangement comprises:

a plurality of wideband filters each disposed to receive one of the plurality of second optical signals provided by the at least one wavelength routing element; and a plurality of tunable narrowband filters each disposed to receive a signal output from one of the plurality of wideband filters.

29. The tunable demultiplexer recited in claim 1 wherein the at least one configurable optical arrangement comprises:

a serial arrangement of tunable wavelength band filters, each such tunable wavelength band filter being adapted to provide a first output that transmits a selected filtered portion of a received optical signal depending on a state of the tunable wavelength band filter and to provide a second output that transmits a remaining portion of the received optical signal;

a plurality of optical splitters, each such optical splitter being disposed to receive a signal from the first output of one of the tunable wavelength band filters; and a plurality of narrowband filters, each such narrowband filter being disposed to receive a signal from one of the optical splitters.

30. The tunable demultiplexer recited in claim 1 wherein the at least one configurable optical arrangement includes a plurality of filter arrangements, each such filter arrangement including a plurality of tunable filters arranged serially and including a first tunable filter disposed to receive an equivalent to one of the second optical signals provided by the at least one wavelength routing element.

31. The tunable demultiplexer recited in claim 1 wherein the correspondence of the subset of the spectral bands to the plurality of output signals is further determined by a state of the at least one wavelength routing element.

32. A tunable demultiplexer for demultiplexing an input optical signal having a plurality of spectral bands onto a plurality of output signals, each output signal corresponding to a selected one or more of the spectral bands, the tunable demultiplexer comprising:

at least one wavelength routing element of the type adapted for selectively routing wavelength components of a first optical signal onto a plurality of second optical signals according to a configurable state of the wavelength routing element; and an optical arrangement disposed to exchange light with the at least one wavelength routing element, wherein a correspondence of a subset of the spectral bands to the plurality of output signals is determined at least in part by a state of the at least one wavelength routing element.

33. The tunable demultiplexer recited in claim 32 wherein the at least one wavelength routing element comprises a plurality of wavelength routing elements, each such wavelength routing element being disposed to receive an equivalent to the input optical signal and configured to route distinct subsets of desired spectral bands to respective filter elements.

34. The tunable demultiplexer recited in claim 33 wherein the optical arrangement includes at least one optical power splitter, wherein the equivalent to the input optical signal is received from the at least one optical power splitter.

35. The tunable demultiplexer recited in claim 34 wherein the at least one optical power splitter comprises a plurality of optical power splitters arranged as a tree.

36. The tunable demultiplexer recited in claim 32 wherein the optical arrangement includes at least one additional wavelength routing element.

37. The tunable demultiplexer recited in claim 36 wherein the at least one additional wavelength routing element comprises a plurality of additional wavelength routing elements arranged as a tree.

38. The tunable demultiplexer recited in claim 32 wherein the optical arrangement comprises a wideband filter disposed to receive one of the second optical signals from the at least one wavelength routing element.

39. The tunable demultiplexer recited in claim 32 wherein the optical arrangement comprises a plurality of fixed wavelength band filters, each adapted to provide a first output that transmits a selected filtered portion of a received optical signal and a second output that transmits a remaining portion of the received optical signal, wherein the plurality of fixed wavelength band filters are serially arranged so that at least one of the fixed wavelength band filters is disposed to receive one of the second optical signals provided by the at least one wavelength routing element.

40. The tunable demultiplexer recited in claim 32 wherein the optical arrangement comprises:

an optical power splitter; and a plurality of optical filter elements disposed to receive light from the optical power splitter.

41. The tunable demultiplexer recited in claim 32 wherein the optical arrangement includes at least one optical space switch.

42. The tunable demultiplexer recited in claim 32 wherein the optical arrangement includes at least one optical interleaver disposed to receive one of the second optical signals from the at least one wavelength routing element.

43. A method for demultiplexing an input optical signal having a plurality of spectral bands onto a plurality of output signals, each output signal corresponding to a selected one or more of the spectral bands, the method comprising:

selectively routing wavelength components of the input optical signal onto a plurality of second optical signals according to a configurable state; and propagating at least one of the plurality of second optical signals through an optical arrangement, wherein a correspondence of a subset of the spectral bands to the plurality of output signals is determined by the configurable state.

44. The method recited in claim 43 wherein propagating at least one of the plurality of second optical signals through the optical arrangement comprises:

power splitting the at least one of the plurality of second optical signals into equivalent optical signals; and filtering the equivalent optical signals.

45. The method recited in claim 43 wherein:

the plurality of output signals comprise a plurality of optical output signals; and propagating at least one of the plurality of second optical signals through the optical arrangement comprises optically redistributing individual spectral bands onto the plurality of optical output signals.

46. The method recited in claim 43 wherein propagating at least one of the plurality of second optical signals through the optical arrangement comprises optically interleaving spectral bands from the at least one of the plurality of second optical signals.

47. The method recited in claim 43 wherein the plurality of output signals comprise a plurality of electrical output signals, the method further comprising:

converting demultiplexed optical signals received from the optical arrangement to demultiplexed electrical signals; and electrically redistributing the demultiplexed electrical signals onto the plurality of electrical output signals.

48. The method recited in claim 43 wherein the optical arrangement is configurable and the correspondence is further determined by a configuration of the optical arrangement.

49. A tunable demultiplexer for demultiplexing an input optical signal having a plurality of spectral bands onto a plurality of output signals, each output signal corresponding to a selected one or more of the spectral bands, the tunable demultiplexer comprising:

means for selectively routing wavelength components of the input optical signal onto a plurality of second optical signals according to a configurable state; and means for assigning a subset of the spectral bands comprised by one of the plurality of second optical signals to corresponding ones of the output signals.

50. The tunable demultiplexer recited in claim 49 wherein the means for assigning comprises:

means for power splitting the one of the plurality of second optical signals into equivalent optical signals; and means for filtering the equivalent optical signals.

51. The tunable demultiplexer recited in claim 49 wherein:

the plurality of output signals comprise a plurality of optical output signals the means for assigning comprises means for optically redistributing individual spectral bands onto the plurality of optical output signals.

52. The tunable demultiplexer recited in claim 49 wherein the means for assigning comprises means for optically interleaving spectral bands from the one of the plurality of second optical signals.

53. The tunable demultiplexer recited in claim 49 wherein the plurality of output signals comprise a plurality of electrical output signals and the means for assigning comprises:

means for converting optical signals to electrical signals; and means for electrically redistributing the electrical signals onto the plurality of electrical output signals.

* * * * *